United States Patent
Onodera

(10) Patent No.: US 11,002,174 B2
(45) Date of Patent: May 11, 2021

(54) ENGINE DEVICE

(71) Applicant: Yanmar Co., Ltd., Osaka (JP)

(72) Inventor: Takayuki Onodera, Osaka (JP)

(73) Assignee: YANMAR POWER TECHNOLOGY CO., LTD., Osaka (JP)

(*) Notice: Subject to any disclaimer, the term of this patent is extended or adjusted under 35 U.S.C. 154(b) by 0 days.

(21) Appl. No.: 16/481,813

(22) PCT Filed: Nov. 9, 2017

(86) PCT No.: PCT/JP2017/040392
§ 371 (c)(1),
(2) Date: Jul. 29, 2019

(87) PCT Pub. No.: WO2018/139003
PCT Pub. Date: Aug. 2, 2018

(65) Prior Publication Data
US 2020/0003107 A1 Jan. 2, 2020

(30) Foreign Application Priority Data
Jan. 30, 2017 (JP) .............................. JP2017-014839

(51) Int. Cl.
F01P 3/02 (2006.01)
F01P 3/20 (2006.01)
(Continued)

(52) U.S. Cl.
CPC ..................... F01P 3/02 (2013.01);
F01P 3/20 (2013.01); F01P 7/16 (2013.01);
(Continued)

(58) Field of Classification Search
CPC ........ F01P 3/02; F01P 3/20; F01P 7/16; F01P 2003/006; F02M 26/32; F02M 26/30;
(Continued)

(56) References Cited

U.S. PATENT DOCUMENTS 6,213,074 B1   4/2001  Freese
7,363,919 B1*  4/2008  Styles ................. F01N 5/02
                                                    123/568.12
(Continued)

FOREIGN PATENT DOCUMENTS

DE   10119484 A   10/2002
EP    3438433 A1   2/2019
(Continued)

OTHER PUBLICATIONS

International Search Report dated Jan. 30, 2018 issued in corresponding PCT Application PCT/JP2017/040392 cites the patent documents above.

(Continued)

Primary Examiner — Joseph J Dallo
Assistant Examiner — Kurt Philip Liethen
(74) Attorney, Agent, or Firm — Norton Rose Fulbright US LLP

(57) ABSTRACT

An engine device including a cylinder head provided with a plurality of air-intake passages for taking fresh air into a plurality of air-intake ports and a plurality of exhaust gas passages for emitting exhaust gas from a plurality of exhaust gas ports. An air-intake manifold which aggregates the air-intake passages is formed integrally with one of left and right side portions of the cylinder head. An EGR cooler is coupled to a front surface of the cylinder head; and EGR gas passages and cooling water passages communicating with the EGR cooler are provided in a coupling portion of the cylinder head with the EGR cooler.

8 Claims, 29 Drawing Sheets

(51) Int. Cl.
*F02M 26/32* (2016.01)
*F01P 7/16* (2006.01)
*F01P 3/00* (2006.01)
*F02F 1/24* (2006.01)
*F28D 21/00* (2006.01)

(52) U.S. Cl.
CPC ............ *F01P 2003/006* (2013.01); *F02F 1/24* (2013.01); *F02M 26/32* (2016.02); *F28D 2021/0089* (2013.01)

(58) Field of Classification Search
CPC ........ F02M 26/23; F02M 26/28; F02M 26/41; F02F 1/24; F02F 1/243; F02F 1/40; F02F 1/36; F28D 2021/0089
See application file for complete search history.

(56) References Cited

U.S. PATENT DOCUMENTS

| | | | |
|---|---|---|---|
| 8,056,545 B2 * | 11/2011 | Feist | F02M 35/161 123/568.12 |
| 2005/0056411 A1 * | 3/2005 | Dilley | F28D 9/0018 165/167 |
| 2011/0315129 A1 * | 12/2011 | Kojima | F02M 26/19 123/568.12 |
| 2015/0226108 A1 * | 8/2015 | Vroman | F02B 29/0437 60/605.2 |
| 2016/0025045 A1 * | 1/2016 | Engineer | F02M 26/28 123/568.12 |
| 2016/0281649 A1 * | 9/2016 | Joisten-Pieritz | F02B 29/0475 |
| 2017/0067423 A1 * | 3/2017 | Beazley | F02F 1/24 |
| 2017/0276095 A1 * | 9/2017 | Beyer | F02M 26/32 |

FOREIGN PATENT DOCUMENTS

| | | |
|---|---|---|
| EP | 3438438 A1 | 2/2019 |
| GB | 2487591 A | 8/2012 |
| JP | 1988-073561 U | 5/1988 |
| JP | 2001-032750 A | 2/2001 |
| JP | 2002-235607 A | 8/2002 |
| JP | 2005-133981 A | 5/2005 |
| JP | 3852255 B2 | 11/2006 |
| JP | 3876139 B2 | 1/2007 |
| JP | 2007-292012 A | 11/2007 |
| JP | 2007292012 A | 11/2007 |
| JP | 2011-127537 A | 6/2011 |
| JP | 2012-172534 A | 9/2012 |
| JP | 5387612 B2 | 1/2014 |
| JP | 2015-034530 A | 2/2015 |
| WO | 2017/169700 A1 | 10/2017 |
| WO | 2017/169702 A1 | 10/2017 |

OTHER PUBLICATIONS

European Search Report dated Nov. 15, 2019 issued in corresponding EP Application 17894049.0 cites the patent documents above.

* cited by examiner

ENGINE DEVICE

CROSS REFERENCES TO RELATED APPLICATIONS

This application is a national stage application pursuant to 35 U.S.C. § 371 of International Application No. PCT/JP2017/040392, filed on Nov. 9, 2017 which claims priority under 35 U.S.C. § 119 to Japanese Patent Application No. 2017-014839 filed on Jan. 30, 2017, the disclosures of which are hereby incorporated by reference in their entireties.

TECHNICAL FIELD

The present invention relates to an engine device.

BACKGROUND ART

Traditionally, a cylinder head having an air-intake port and an exhaust gas port has an air-intake manifold and an exhaust gas manifold coupled to left and right side surfaces thereof (see Patent Literature 1; hereinafter, PTL 1). Further, as a countermeasure against exhaust gas of diesel engines and the like, there has been known a technology that adopts an EGR device (exhaust-gas recirculation device), which circulates a portion of exhaust gas to an intake side, to keep the combustion temperature low, thereby reducing an amount of NOx (nitrogen oxide) in the exhaust gas (see Patent Literature 2 to Patent Literature 4; hereinafter, respectively referred to as PTL 2 to PTL 4).

CITATION LIST

Patent Literature

PTL 1: Japanese Patent No. 3876139
PTL 2: Japanese Patent No. 3852255
PTL 3: Japanese Patent Application Laid-Open No. 2002-235607
PTL 4: Japanese Patent No. 5387612

SUMMARY OF INVENTION

Technical Problem

An installation space for a diesel engine varies depending on a work vehicle (such as a construction machine or an agricultural machine) to which the diesel engine is installed. Recently, due to demand for weight reduction and compactification, the installation space is often restricted (confined). It is therefore necessary that component parts of the diesel engine are arranged in a compact layout. In addition to such a problem of the restricted installation space, a structure with a high rigidity is required of a cylinder head because component parts such as an EGR device and a turbocharger are coupled to and supported by the cylinder head.

In a cylinder head of an engine as disclosed in each of PTL 2 and PTL 3, an EGR gas passage is structured in the cylinder head. Structuring an EGR gas passage in a cylinder head however leads to a complicated structure as in PTL 2, resulting in a low degree of freedom in the layout of passages, and increased time and costs of processing.

If an EGR cooler is connected through a pipe, the volume of the EGR gas increases due to an increase in the EGR gas temperature caused by generated heat of the diesel engine. Due to this, a sufficient EGR gas amount cannot be maintained, and reduction of the NOx in the exhaust gas becomes difficult. On the other hand, if the EGR gas is excessively cooled by having an EGR pipe exposed to cooling air from a cooling fan and the like, the combustion in the cylinder is affected. For the reasons above, appropriate arrangement and structure of parts in the diesel engine and an appropriate cooling structure need to be considered for the purpose of supplying the EGR gas at an appropriate temperature. Additionally, if there is unevenness in the mixture distribution of the EGR gas and fresh air, the EGR gas amount in the fresh air supplied to a plurality of cylinders will be uneven. This affects actions of reducing the NOx and combustion in each of the cylinders, thus deteriorating the operation efficiency of the diesel engine.

A technical problem of the present invention is to provide an engine device that is improved based on studies on the existing circumstances as mentioned above.

Solution to Problem

An aspect of the present invention is an engine device including: a cylinder head provided with a plurality of air-intake passages for taking fresh air into a plurality of air-intake ports and a plurality of exhaust gas passages for emitting exhaust gas from a plurality of exhaust gas ports; an exhaust gas manifold communicating with the exhaust gas passages; and an EGR cooler configured to cool EGR gas constituting a part of the exhaust gas from the exhaust gas manifold, wherein: an air-intake manifold which aggregates the air-intake passages is formed integrally with one of left and right side portions of the cylinder head; the EGR cooler is coupled to one of front and rear surfaces of the cylinder head; and an EGR gas passage and a cooling water passage communicating with the EGR cooler are provided in a coupling portion of the cylinder head with the EGR cooler.

The engine device may be such that: an outer peripheral wall surrounding an area ranging from a border with the air-intake manifold to a coupling portion with the exhaust gas manifold is provided to the cylinder head in a standing manner, and the cooling water passage having an L-shape is provided on one of left and right side walls and one of front and rear side walls of the outer peripheral wall.

The engine device may be such that the cylinder head is fastened and fixed above the cylinder block by a plurality of bolts inserted into the one of left and right side walls and both front and rear side walls of the outer peripheral wall.

The engine device may be such that the cylinder head is provided with a cooling water drainage communicating with the cooling water passage provided on the outer peripheral wall, at a position adjacent to an end portion of the air-intake manifold on the other one of the front and rear side.

The engine device may be such that: a pair of left and right coupling bases for coupling with the EGR cooler are provided on the one of the front and rear side walls of the cylinder head; and each of the coupling bases in the left and right pair has a structure in which the EGR gas passage and the cooling water passage are bored and arranged one above the other.

The engine device may be such that: one of the coupling bases is structured to have the EGR gas passage above the cooling water passage; and the other one of the coupling bases is structured to have the EGR gas passage below the cooling water passage.

Advantageous Effects of Invention

With the above aspect of the present invention, since the cylinder head is integrated with the air-intake manifold, a gas sealability between the air-intake manifold and the air-intake passage can be enhanced, and in addition, the rigidity of the cylinder head can be increased. In addition, when a part such as an EGR device and a turbocharger is coupled to the cylinder head, the support rigidity of the cylinder head can be increased, and the number of parts for a seal member on the intake side in the cylinder head can be reduced.

In the above aspect of the present invention, the EGR cooler is directly coupled to the cylinder head. Therefore, it is not necessary that cooling water piping and EGR gas piping are disposed between the EGR cooler and the cylinder head. This can give a sealability to a coupling portion coupled to the EGR cooler without any influence of, for example, extension and contraction of piping caused by the EGR gas or the cooling water. This can also enhance a resistance (structural stability) against external fluctuation factors such as heat and vibration, and moreover can make the configuration compact. Since the EGR gas passage and the cooling water passage are provided in the coupling bases, the shapes of the passages formed in the cylinder head are simplified, so that the cylinder head can be easily formed by casting without using a complicated core.

With the present invention, the cooling water passage is formed along the outer peripheral wall of the cylinder head, and the side wall having the cooling water passage is structured as a beam, which improves the rigidity of the cylinder head against warpage. Therefore, when manufacturing the cylinder head by casting, the warpage at the time of opening dies after casting can be reduced. Further, the cooling water flowing in the cooling water passage in the outer peripheral wall suppresses or reduces expansion (thermal deformation) of bolts due to combustion heat of the cylinder and the like, and the cylinder head can be connected to the cylinder block with a high rigidity, and the sealing performance of the cylinder is not lost.

With the above-aspect of the present invention, since the EGR gas passage and the cooling water passage are provided in the coupling bases protruding at a distance from each other, mutual influence of thermal deformation between the coupling bases is relieved. In the coupling bases, the EGR gas flowing in the EGR gas passage is cooled by the cooling water flowing in the cooling water passage, so that thermal deformations of the coupling bases are suppressed or reduced. In addition, the up-down positional relationship of the EGR gas passage and the cooling water passage in one of the coupling bases is reverse to that in the other of the coupling bases. As a result, heat distributions in the respective coupling bases are in opposite directions with respect to the up-down direction, which can reduce the influence of thermal deformation in the height direction in the cylinder head.

DESCRIPTION OF EMBODIMENTS

Figure 1:
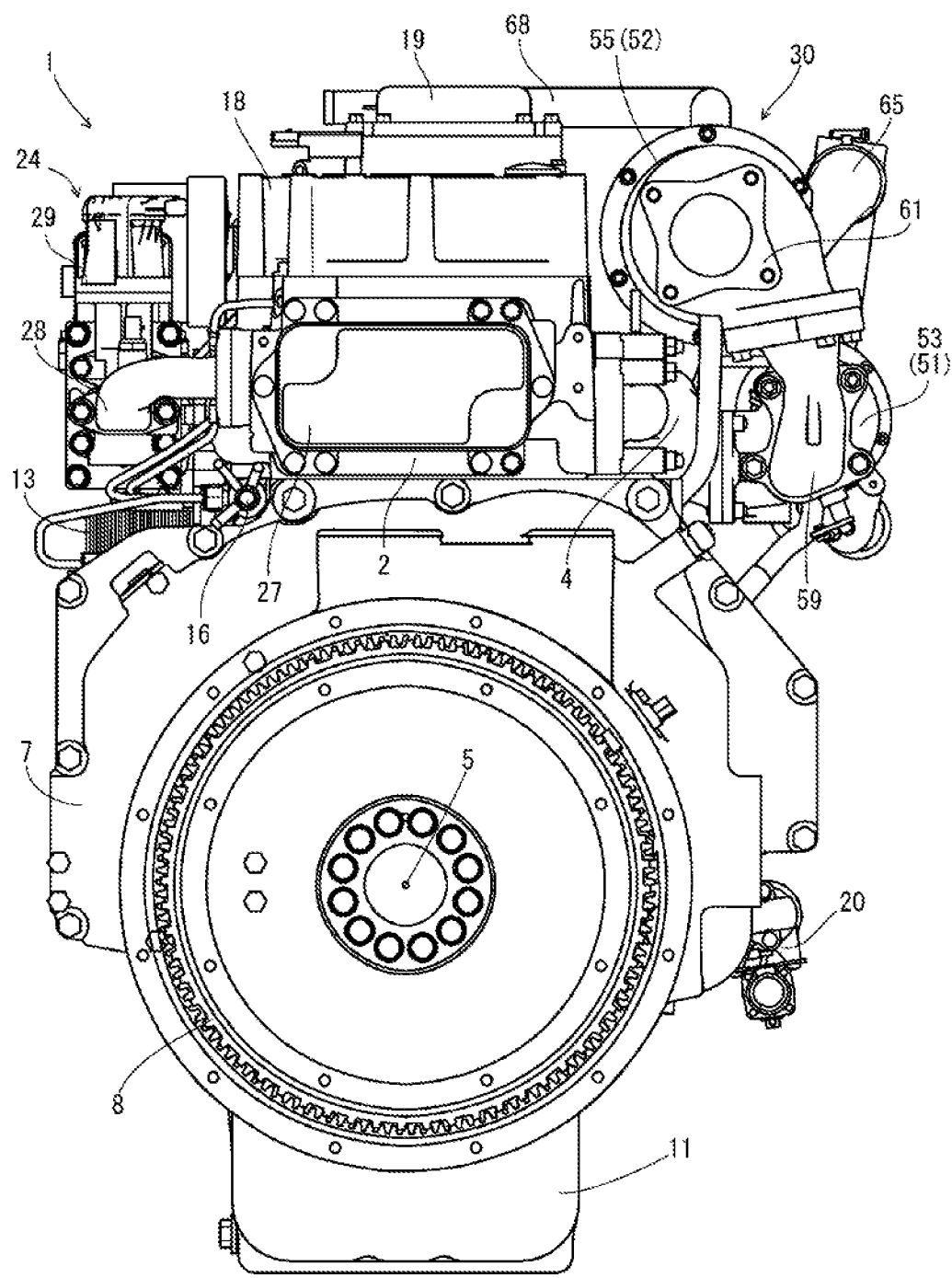
FIG. 1 A front view of an engine.
Figure 2:
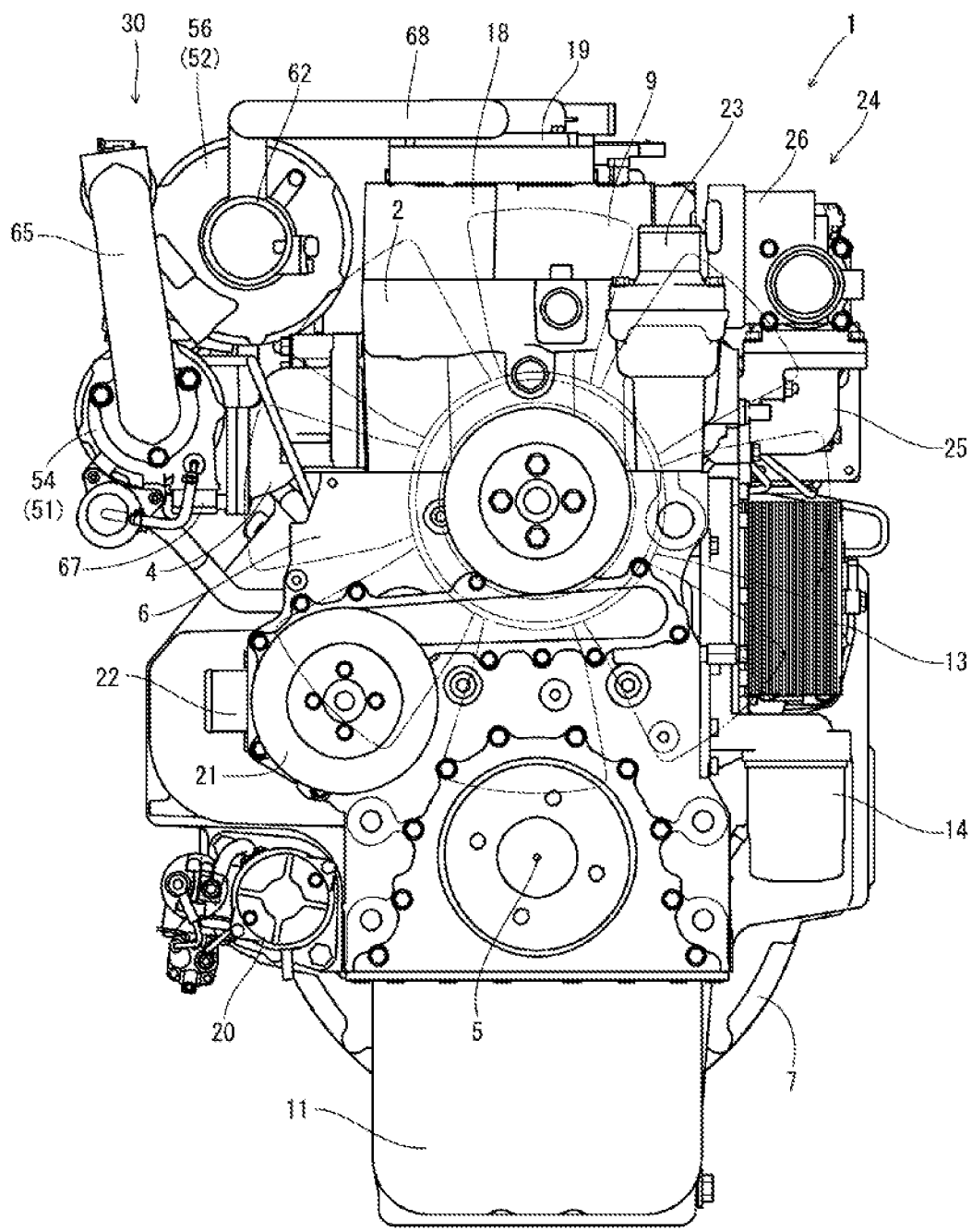
FIG. 2 A rear view of the engine.
Figure 3:
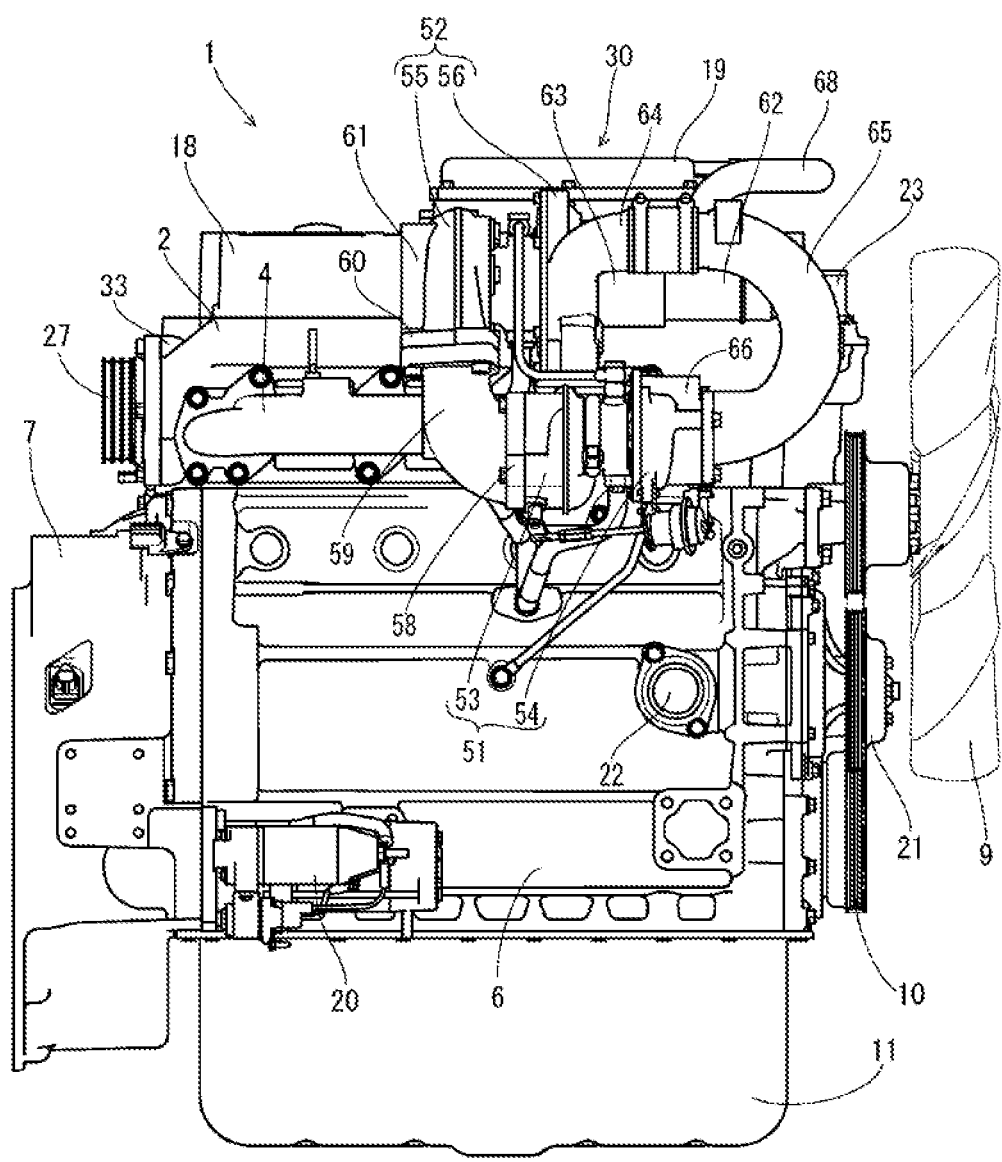
FIG. 3 A left side view of the engine.
Figure 4:
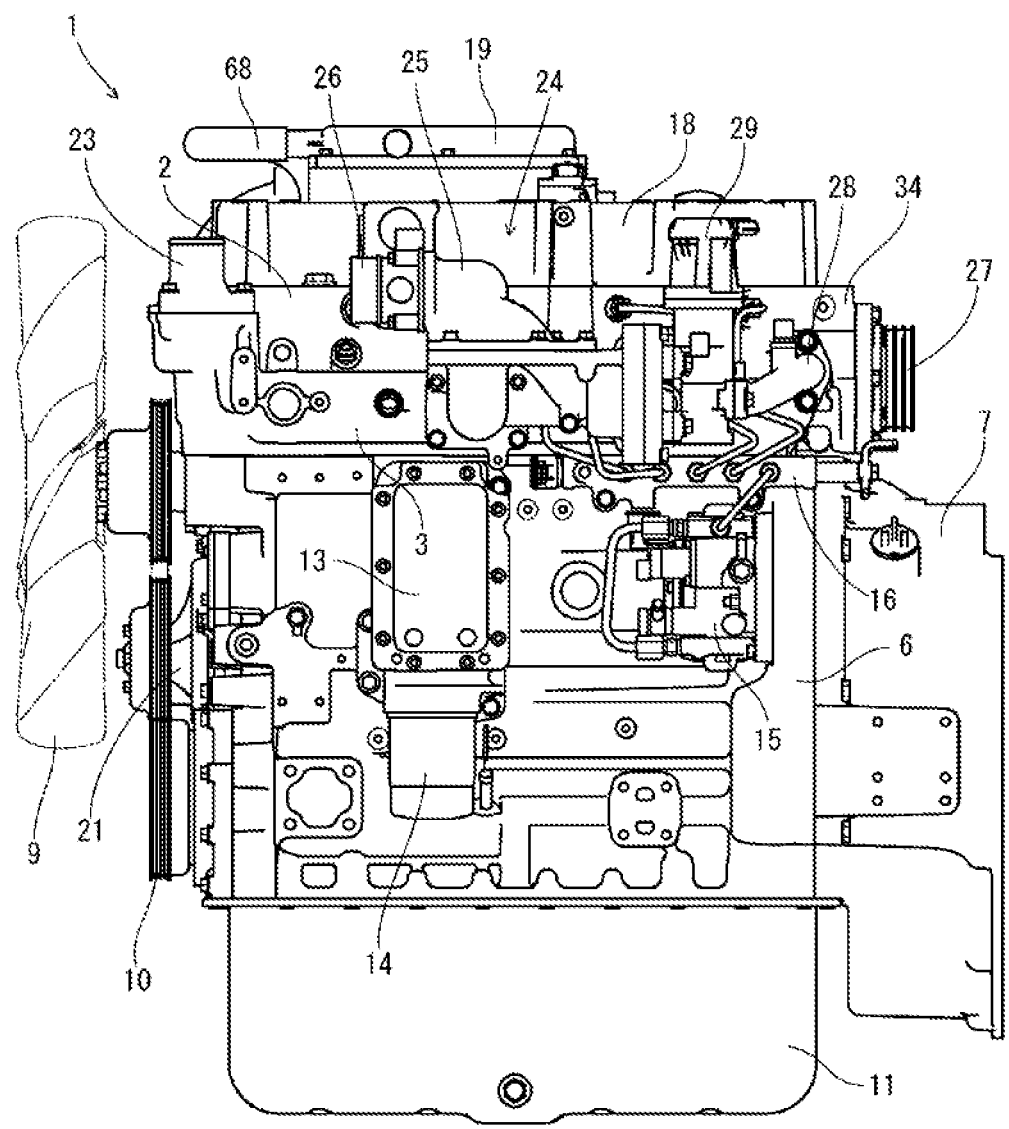
FIG. 4 A right side view of the engine.
Figure 5:
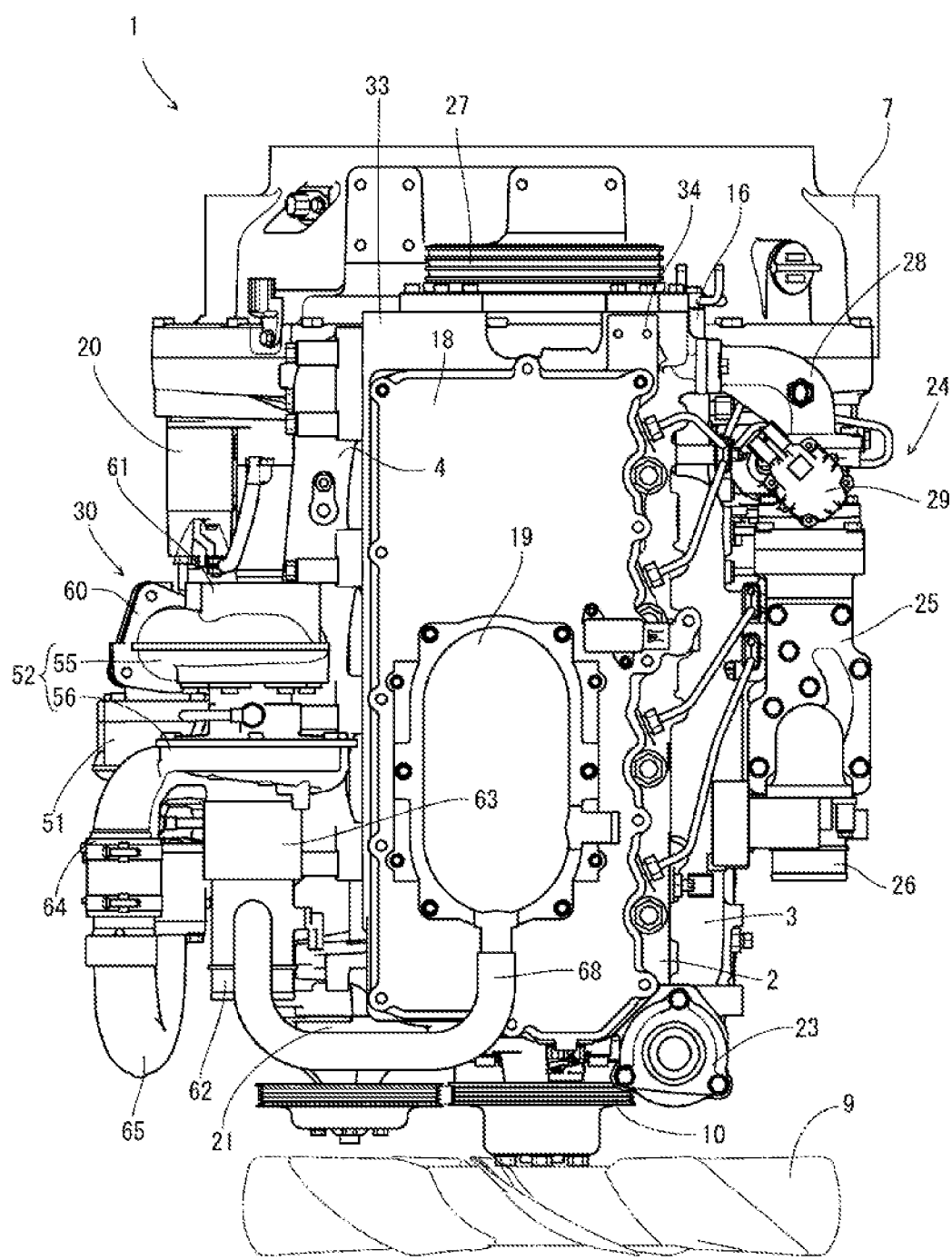
FIG. 5 A top plan view of the engine.
Figure 6:
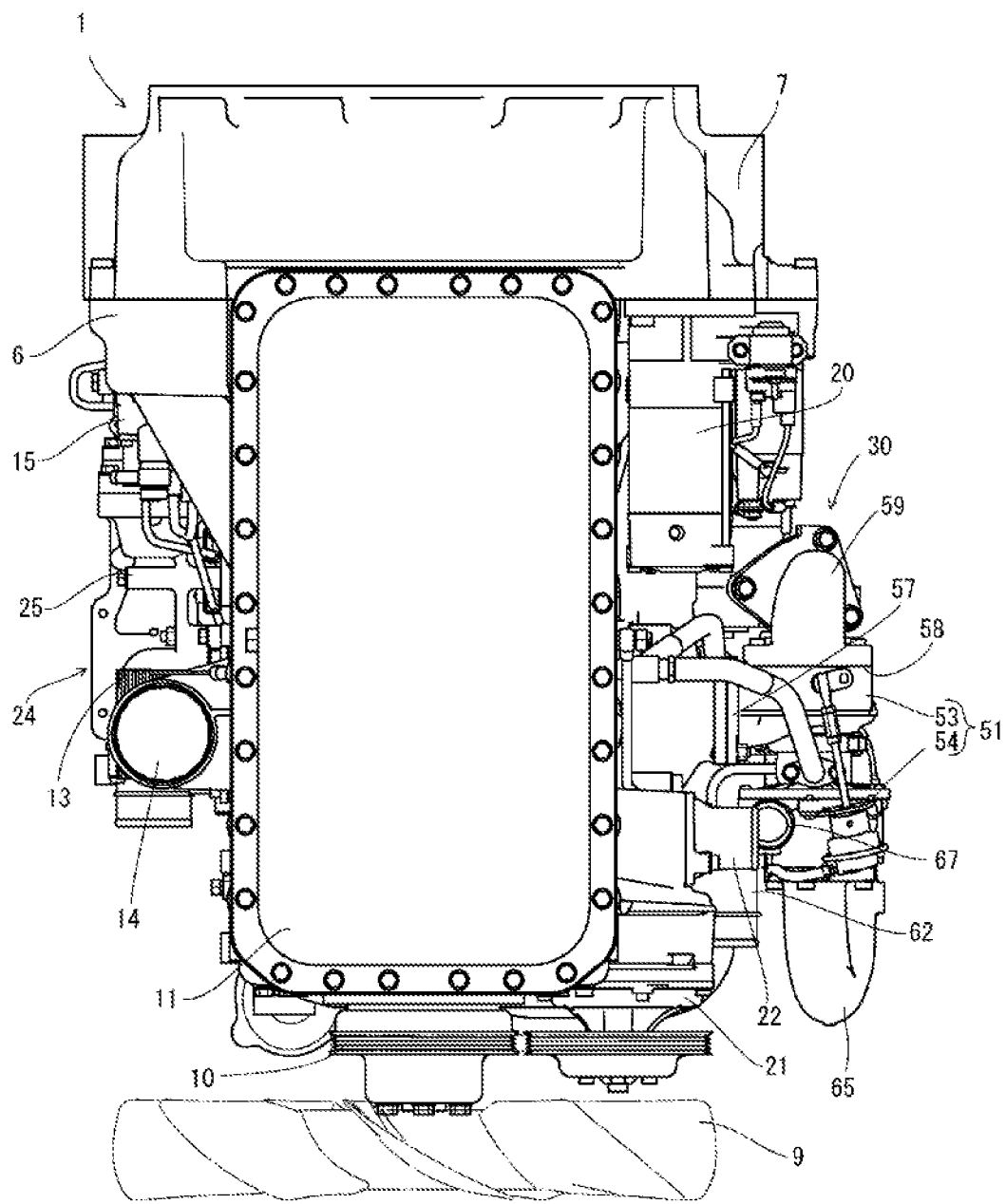
FIG. 6 A bottom view of the engine.
Figure 7:
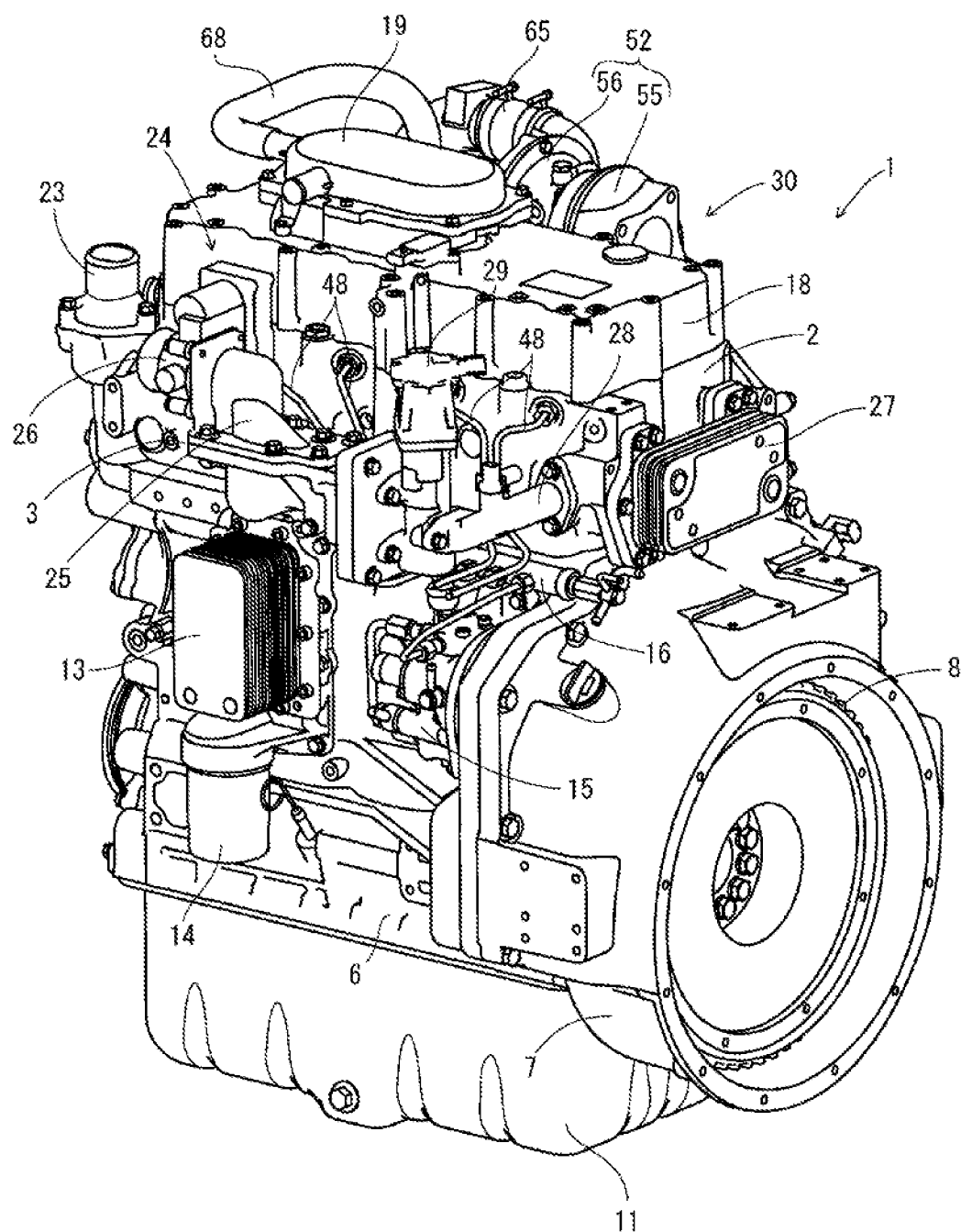
FIG. 7 A perspective view of the engine as viewed from diagonally front.
Figure 8:
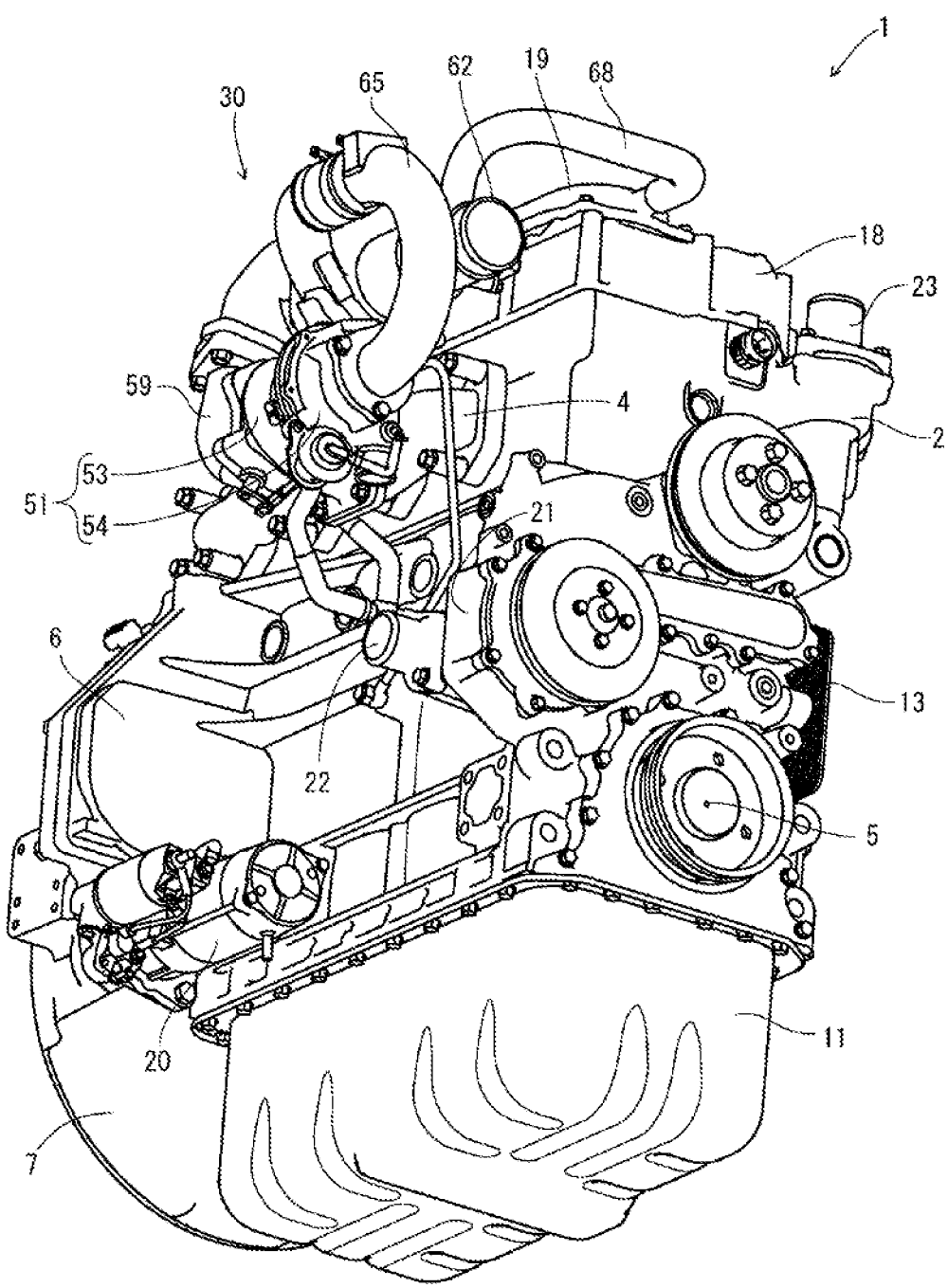
FIG. 8 A perspective view of the engine as viewed from diagonally rear.
Figure 9:
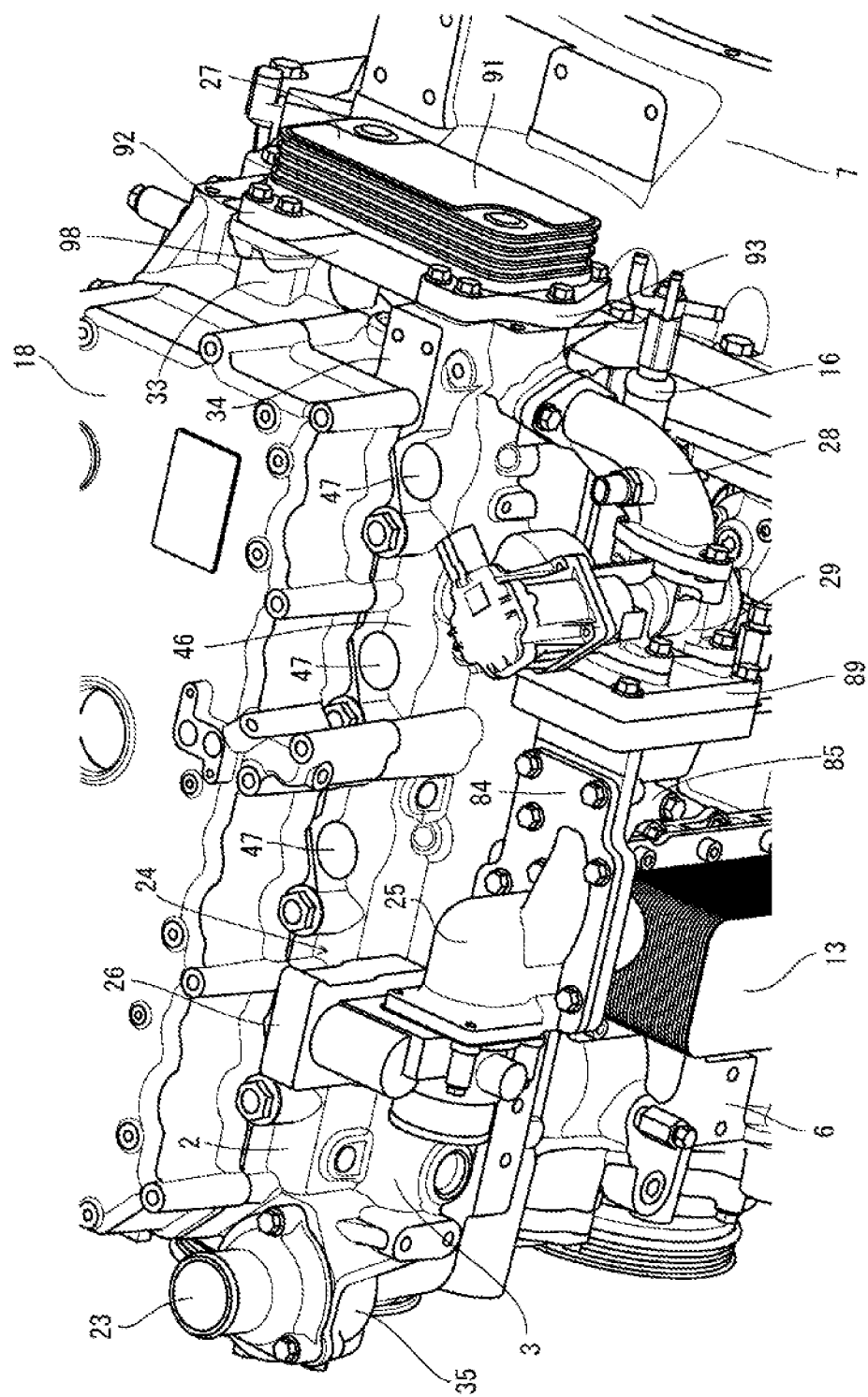
FIG. 9 An enlarged perspective view of a cylinder head as viewed from an air-intake manifold side.
Figure 10:
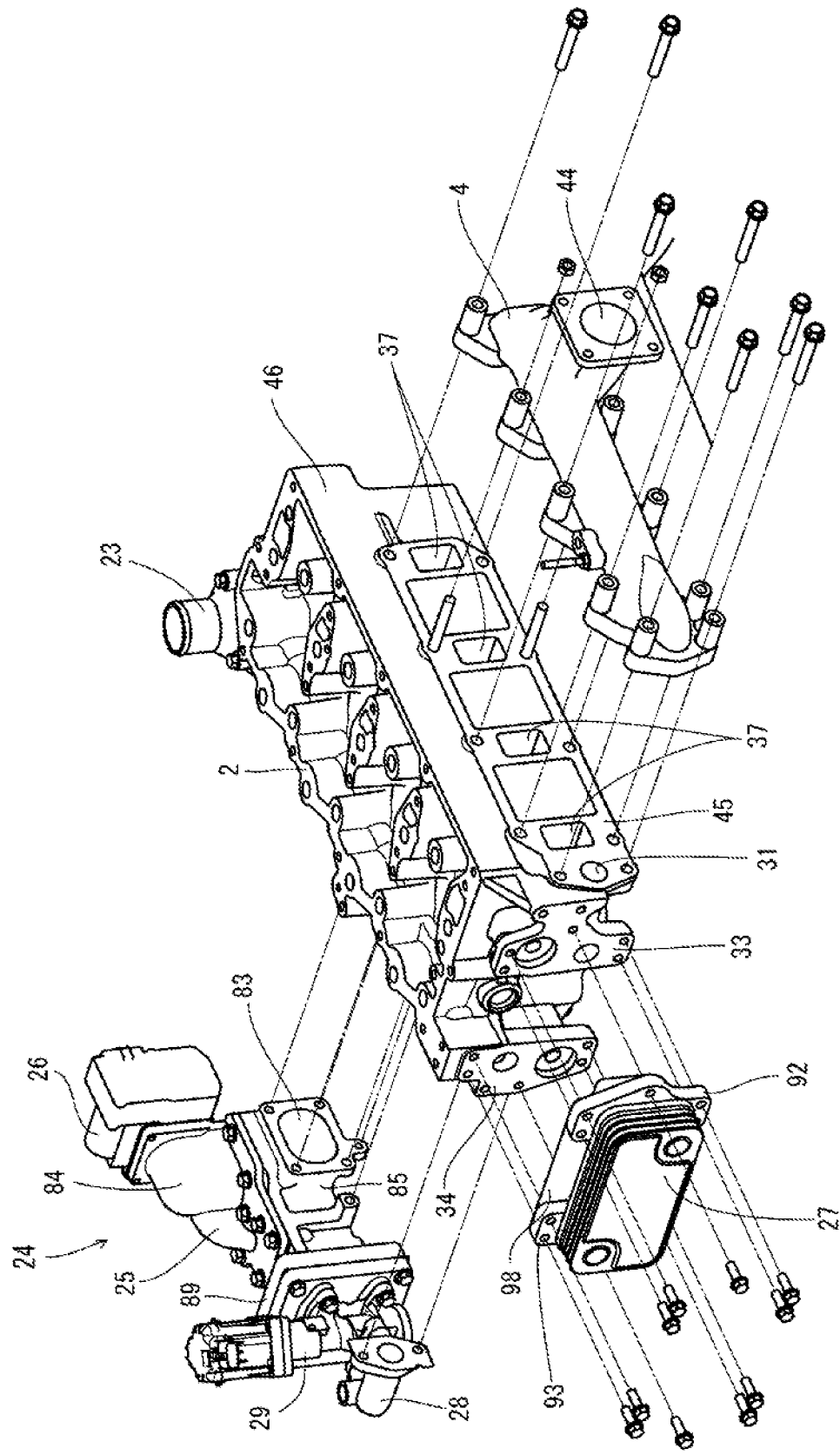
FIG. 10 An exploded perspective view of the cylinder head as viewed from an exhaust gas manifold side.
Figure 11:
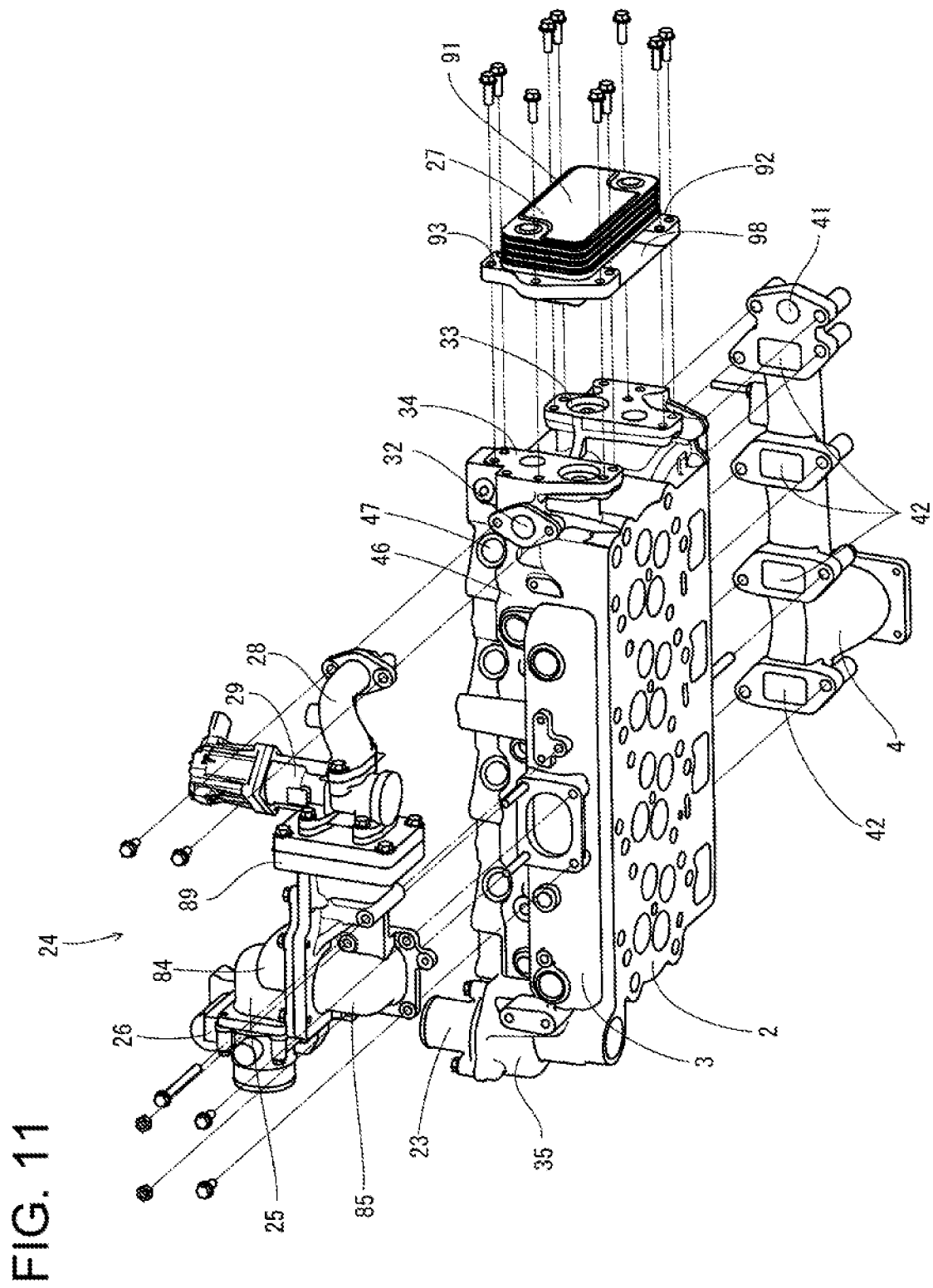
FIG. 11 An exploded perspective view of the cylinder head as viewed from the air-intake manifold side.
Figure 12:
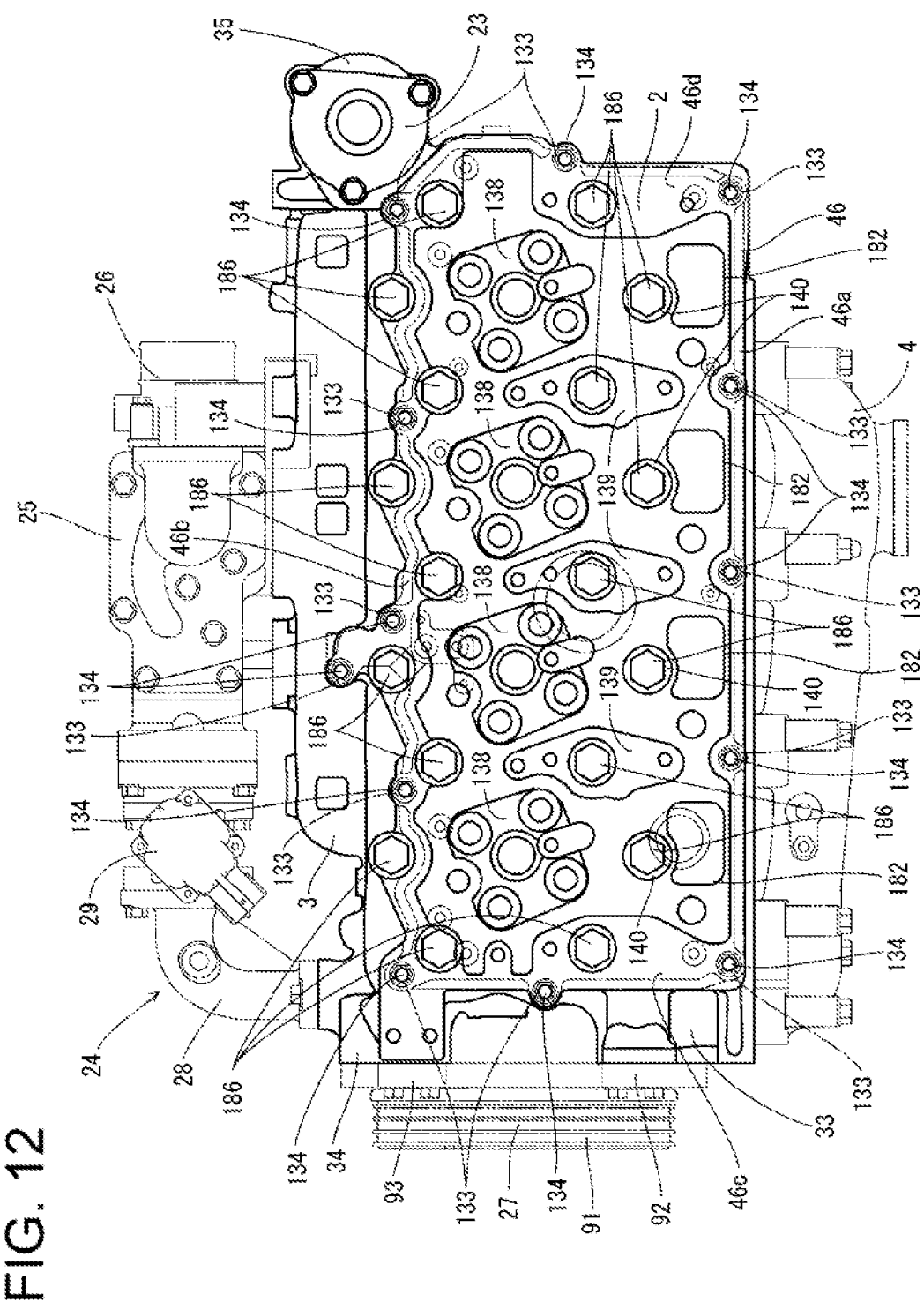
FIG. 12 A top plan view of the cylinder head.
Figure 13:
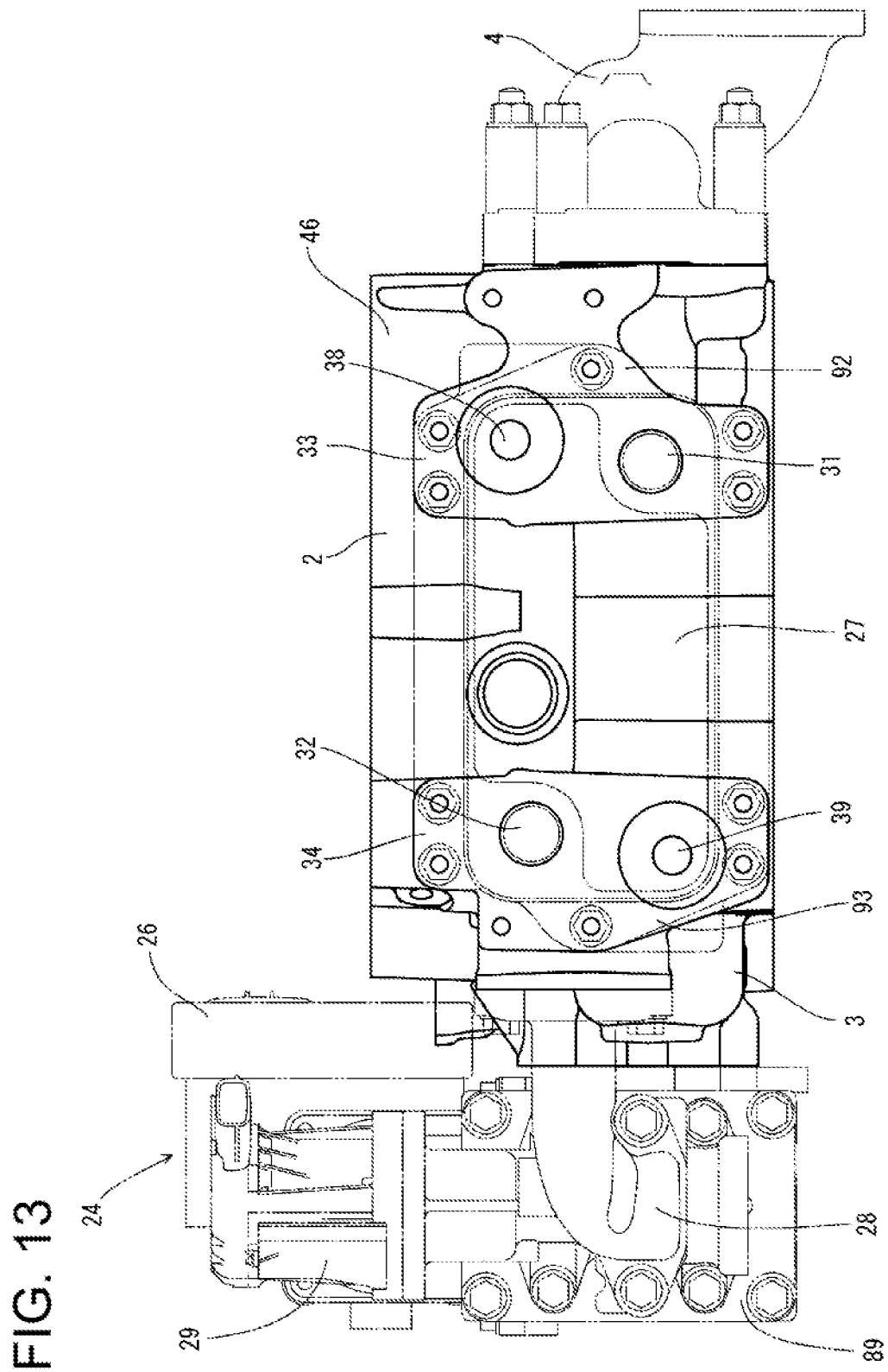
FIG. 13 A front view of the cylinder head.
Figure 14:
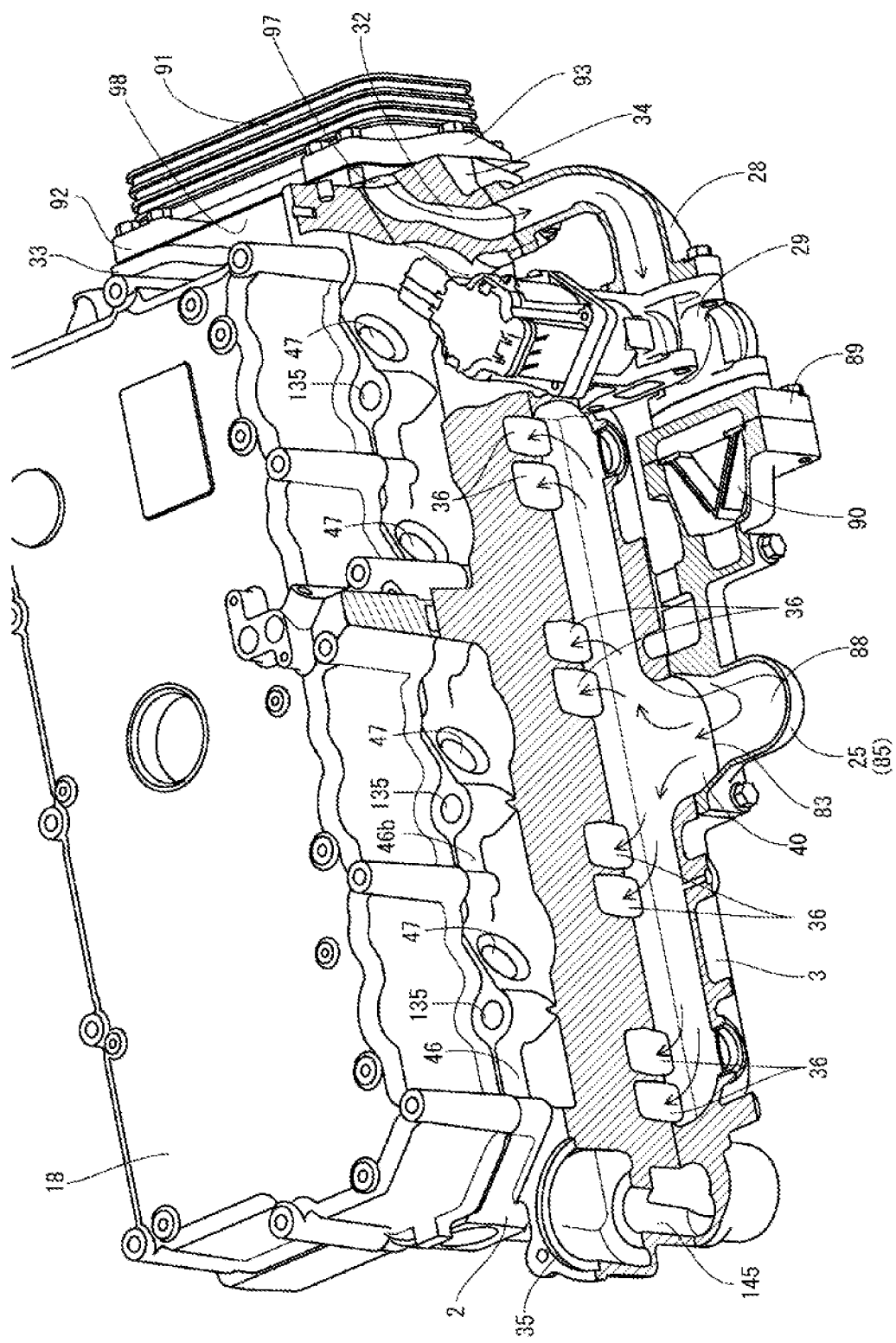
FIG. 14 A perspective cross-sectional view of the cylinder head and an EGR device.
Figure 15:
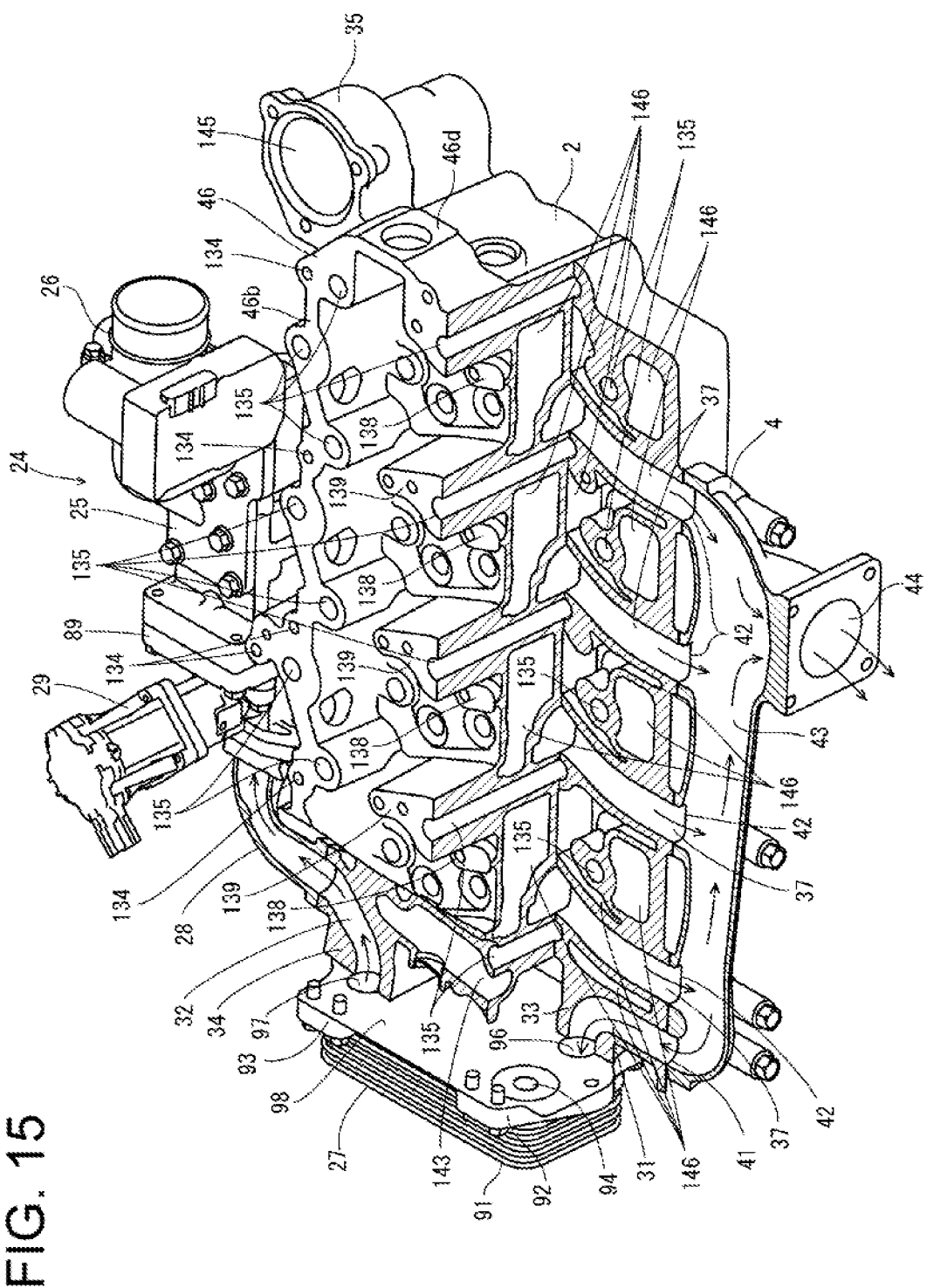
FIG. 15 A perspective cross-sectional view of the cylinder head and the exhaust gas manifold.
Figure 16:
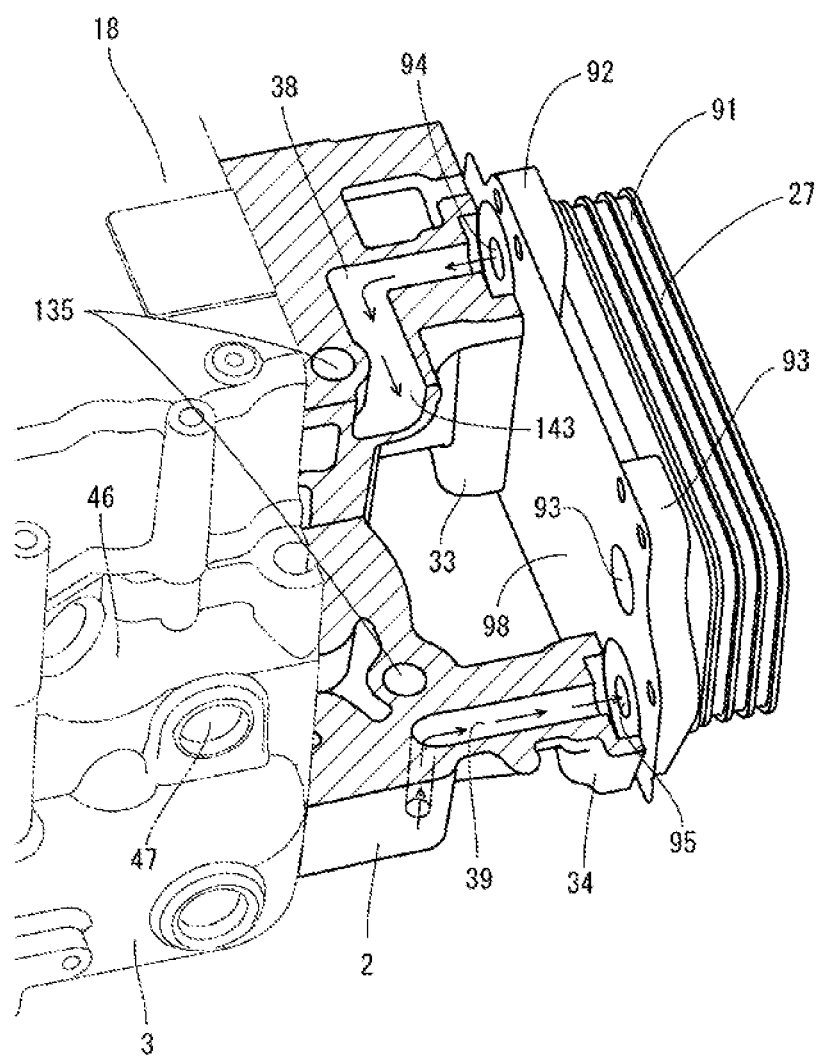
FIG. 16 A perspective cross-sectional view of a coupling portion of the cylinder head coupled to an EGR cooler.

In the following, an embodiment of the present invention will be described with reference to the drawings. First, referring to FIG. 1 to FIG. 8, an overall structure of a diesel engine (engine device) 1 will be described. In the descriptions below, opposite side portions parallel to a crankshaft 5 (side portions on opposite sides relative to the crankshaft 5) will be defined as left and right, a side where a flywheel housing 7 is disposed will be defined as front, and a side where a cooling fan 9 is disposed will be defined as rear. For convenience, these are used as a benchmark for a positional relationship of left, right, front, rear, up, and down in the diesel engine 1.

As shown in FIG. 1 to FIG. 8, an air-intake manifold 3 and an exhaust gas manifold 4 are disposed in one side portion and the other side portion of the diesel engine 1 parallel to the crankshaft 5. In the embodiment, the air-intake manifold 3 provided on a right surface of a cylinder head 2 is formed integrally with the cylinder head 2. The exhaust gas manifold 4 is provided on a left surface of the cylinder head 2. The cylinder head 2 is mounted on a cylinder block 6 in which the crankshaft 5 and a piston (not shown) are disposed.

The crankshaft 5 has its front and rear distal ends protruding from front and rear surfaces of the cylinder block 6. The flywheel housing 7 is fixed to one side portion of the diesel engine 1 (in the embodiment, a front surface side of the cylinder block 6) intersecting the crankshaft 5. A flywheel 8 is disposed in the flywheel housing 7. The flywheel 8, which is pivotally supported on the front end side of the crankshaft 5, is configured to rotate integrally with the crankshaft 5. The flywheel 8 is configured such that power of the diesel engine 1 is extracted to an actuating part of a work machine (for example, a hydraulic shovel, a forklift, or the like) through the flywheel 8. The cooling fan 9 is disposed in the other side portion of the diesel engine 1 (in the embodiment, a rear surface side of the cylinder block 6) intersecting the crankshaft 5. A rotational force is transmitted from the rear end side of the crankshaft 5 to the cooling fan 9 through a V-belt 10.

An oil pan 11 is disposed on a lower surface of the cylinder block 6. A lubricant is stored in the oil pan 11. The lubricant in the oil pan 11 is suctioned by an oil pump (not shown) disposed on the right surface side of the cylinder block 6, the oil pump being arranged in a coupling portion where the cylinder block 6 is coupled to the flywheel housing 7. The lubricant is then supplied to lubrication parts of the diesel engine 1 through an oil cooler 13 and an oil filter 14 that are disposed on the right surface of the cylinder block 6. The lubricant supplied to the lubrication parts is then returned to the oil pan 11. The oil pump (not shown) is configured to be driven by rotation of the crankshaft 5.

In the coupling portion where the cylinder block 6 is coupled to the flywheel housing 7, a fuel feed pump 15 for feeding a fuel is attached. The fuel feed pump 15 is disposed below an EGR device 24. A common rail 16 is fixed to a side surface of the cylinder block 6 at a location below the air-intake manifold 3 of the cylinder head 2. The common rail 16 is disposed above the fuel feed pump 15. Injectors 17 (see FIG. 17) for four cylinders are provided on an upper surface of the cylinder head 2 which is covered with a head cover 18. Each of the injectors has a fuel injection valve of electromagnetic-controlled type.

Each of the injectors 17 is connected to a fuel tank (not shown) through the fuel feed pump 15 and the common rail 16 having a cylindrical shape. The fuel tank is mounted in a work vehicle. A fuel in the fuel tank is pressure-fed from the fuel feed pump 15 to the common rail 16, so that a high-pressure fuel is stored in the common rail 16. By controlling the opening/closing of the fuel injection valves of the injectors 17, the high-pressure fuel in the common rail 16 is injected from the injectors 17 to the respective cylinders of the diesel engine 1.

A blow-by gas recirculation device 19 is provided on an upper surface of the head cover 18 covering air-intake valves 136 and exhaust valves 137 (see FIG. 17), etc. disposed on the upper surface of the cylinder head 2. The blow-by gas recirculation device 19 takes in a blow-by gas that has leaked out of a combustion chamber of the diesel engine 1 or the like toward the upper surface of the cylinder head 2. A blow-by gas outlet of the blow-by gas recirculation device 19 is in communication with an intake part of a two-stage turbocharger 30 through a recirculation hose 68. A blow-by gas, from which a lubricant component is removed in the blow-by gas recirculation device 19, is then recirculated to the air-intake manifold 3 via the two-stage turbocharger 30.

An engine starter 20 is attached to the flywheel housing 7. The engine starter 20 is disposed below the exhaust gas manifold 4. A position where the engine starter 20 is attached to the flywheel housing 7 is below a coupling portion where the cylinder block 6 is coupled to the flywheel housing 7.

A cooling water pump 21 for smoothing cooling water is provided in a portion of the rear surface of the cylinder block 6, the portion being a little left-hand. The cooling water pump 21 is disposed below the cooling fan 9. Rotation of the crankshaft 5 causes the cooling water pump 21 as well as the cooling fan 9 to be driven through the cooling fan driving V-belt 10. Driving the cooling water pump 21 causes cooling water in a radiator (not shown) mounted in the work vehicle to be supplied to the cooling water pump 21. The cooling water is then supplied to the cylinder head 2 and the cylinder block 6, to cool the diesel engine 1.

The cooling water pump 21 is disposed below the exhaust gas manifold 4, and a cooling water inlet pipe 22 is provided on the left surface of the cylinder block 6 and is fixed at a height equal to the height of the cooling water pump 21. The cooling water inlet pipe 22 is in communication with a cooling water outlet of the radiator. A cooling water outlet pipe 23 that is in communication with a cooling water inlet of the radiator is fixed to an upper rear portion of the cylinder head 2. The cylinder head 2 has a cooling water drainage 35 that protrudes rearward from the air-intake manifold 3. The cooling water outlet pipe 23 is provided on an upper surface of the cooling water drainage 35.

The inlet side of the air-intake manifold 3 is coupled to an air cleaner (not shown) via a collector (EGR main body case) 25 of an EGR device 24 (exhaust-gas recirculation device) which will be described later. Fresh air (outside air) suctioned by the air cleaner is subjected to dust removal and purification in the air cleaner, then fed to the air-intake manifold 3 through the collector 25, and then supplied to the respective cylinders of the diesel engine 1. In the embodiment, the collector 25 of the EGR device 24 is coupled to the right side of the air-intake manifold 3 which is formed integrally with the cylinder head 2 to form the right surface of the cylinder head 2. That is, an outlet opening of the collector 25 of the EGR device 24 is coupled to an inlet opening of the air-intake manifold 3 provided on the right surface of the cylinder head 2. In this embodiment, the collector 25 of the EGR device 24 is coupled to the air cleaner via an intercooler (not shown) and the two-stage turbocharger 30, as will be described later.

The EGR device 24 includes: the collector 25 serving as a relay pipe passage that mixes a recirculation exhaust gas of the diesel engine 1 (an EGR gas from the exhaust gas manifold 4) with fresh air (outside air from the air cleaner), and supplies a mixed gas to the air-intake manifold 3; an air-intake throttle member 26 that communicates the collector 25 with the air cleaner; a recirculation exhaust gas tube 28 that constitutes a part of a recirculation flow pipe passage connected to the exhaust gas manifold 4 via an EGR cooler 27; and an EGR valve member 29 that communicates the collector 25 with the recirculation exhaust gas tube 28.

The EGR device 24 is disposed on the right lateral side of the air-intake manifold 3 in the cylinder head 2. The EGR device 24 is fixed to the right surface of the cylinder head 2, and is in communication with the air-intake manifold 3 in the cylinder head 2. In the EGR device 24, the collector 25 is coupled to the air-intake manifold 3 on the right surface of the cylinder head 2, and an EGR gas inlet of the recirculation exhaust gas tube 28 is coupled and fixed to a front portion of the air-intake manifold 3 on the right surface of the cylinder head 2. The EGR valve member 29 and the air-intake throttle member 26 are coupled to the front and rear of the collector 25, respectively. An EGR gas outlet of the recirculation exhaust gas tube 28 is coupled to the rear end of the EGR valve member 29.

The EGR cooler 27 is fixed to the front surface of the cylinder head 2. The cooling water and the EGR gas flowing in the cylinder head 2 flows into and out of the EGR cooler 27. In the EGR cooler 27, the EGR gas is cooled. EGR cooler coupling bases 33, 34 for coupling the EGR cooler 27 to the front surface of the cylinder head 2 protrude from left and right portions of the front surface of the cylinder head 2. The EGR cooler 27 is coupled to the coupling bases 33, 34. That is, the EGR cooler 27 is disposed on the front side of the cylinder head 2 and at a position above the flywheel housing 7 such that a rear end surface of the EGR cooler 27 and the front surface of the cylinder head 2 are spaced from each other.

The two-stage turbocharger 30 is disposed on a lateral side (in the embodiment, the left lateral side) of the exhaust gas manifold 4. The two-stage turbocharger 30 includes a high-pressure turbocharger 51 and a low-pressure turbocharger 52. The high-pressure turbocharger 51 includes a high-pressure turbine 53 in which a turbine wheel (not shown) is provided and a high-pressure compressor 54 in which a blower wheel (not shown) is provided. The low-pressure turbocharger 52 includes a low-pressure turbine 55 in which a turbine wheel (not shown) is provided and a low-pressure compressor 56 in which a blower wheel (not shown) is provided.

An exhaust gas inlet 57 of the high-pressure turbine 53 is coupled to the exhaust gas manifold 4. An exhaust gas inlet 60 of the low-pressure turbine 55 is coupled to an exhaust gas outlet 58 of the high-pressure turbine 53 via a high-pressure exhaust gas tube 59. An exhaust gas introduction side end portion of an exhaust gas discharge pipe (not shown) is coupled to an exhaust gas outlet 61 of the low-pressure turbine 55. A fresh air supply side (fresh air outlet side) of the air cleaner (not shown) is connected to a fresh air inlet port (fresh air inlet) 63 of the low-pressure compressor 56 via an air supply pipe 62. A fresh air inlet port 66 of the high-pressure compressor 54 is coupled to a fresh air supply port (fresh air outlet) 64 of the low-pressure compressor 56 via a low-pressure fresh air passage pipe 65. A fresh air introduction side of the intercooler (not shown) is connected to a fresh air supply port 67 of the high-pressure compressor 54 via a high-pressure fresh air passage pipe (not shown).

The high-pressure turbocharger 51 is coupled to the exhaust gas outlet 58 of the exhaust gas manifold 4, and is fixed to the left lateral side of the exhaust gas manifold 4. On the other hand, the low-pressure turbocharger 52 is coupled to the high-pressure turbocharger 51 via the high-pressure exhaust gas tube 59 and the low-pressure fresh air passage pipe 65, and is fixed above the exhaust gas manifold 4. Thus, the exhaust gas manifold 4 and the high-pressure turbocharger 51 with a small diameter are disposed side-by-side with respect to the left-right direction below the low-pressure turbocharger 52 with a large diameter. As a result, the two-stage turbocharger 30 is arranged so as to surround the left surface and the upper surface of the exhaust gas manifold 4. That is, the exhaust gas manifold 4 and the two-stage turbocharger 30 are arranged so as to form a rectangular shape in a rear view (or front view), and are compactly fixed to the left surface of the cylinder head 2.

Next, referring to FIG. 9 to FIG. 21 and FIG. 27, a configuration of the cylinder head 2 will be described. As shown in FIG. 9 to FIG. 21 and FIG. 27, the cylinder head 2 is provided with a plurality of air-intake passages 36 for taking fresh air into a plurality of air-intake ports 141 and a plurality of exhaust gas passages 37 for emitting an exhaust gas from a plurality of exhaust gas ports 142. The air-intake manifold 3 which aggregates the plurality of air-intake passages 36 is formed integrally with a right side portion of the cylinder head 2. Since the cylinder head 2 is integrated with the air-intake manifold 3, a gas sealability between the air-intake manifold 3 and the air-intake passages 36 can be enhanced, and in addition, the rigidity of the cylinder head 2 can be increased.

The cylinder head 2 is configured such that the exhaust gas manifold 4 is coupled to the left surface of the cylinder head 2 which is opposite to the right surface where the air-intake manifold 3 is provided, and the EGR cooler 27 is coupled to the front surface (a surface on the flywheel housing 7 side) of the cylinder head 2 which is adjacent to the left and right surfaces. Coupling bases (EGR cooler coupling bases) 33, 34 to which the EGR cooler 27 is coupled are provided so as to protrude from the front surface of the cylinder head 2. The coupling bases 33, 34 are provided therein with EGR gas passages (EGR gas relay passages) 31, 32 and cooling water passages (cooling water relay passages) 38, 39.

Since the EGR gas relay passages 31, 32 and the cooling water passages 38, 39 are provided in the coupling bases 33, 34 to which the EGR cooler 27 is coupled, it is not necessary that cooling water piping and EGR gas piping are disposed between the EGR cooler 27 and the cylinder head 2. This can give a sealability to a coupling portion coupled to the EGR cooler 27 without any influence of, for example, extension and contraction of piping caused by the EGR gas or the cooling water. This can also enhance a resistance (structural stability) against external fluctuation factors such as heat and vibration, and moreover can make the configuration compact.

The cylinder head 2 includes an upstream EGR gas relay passage 31 through which a front portion of the left surface is in communication with the front surface. An EGR gas outlet 41 disposed at the front end of the exhaust gas manifold 4 is in communication with the upstream EGR gas relay passage 31. The cylinder head 2 also includes a downstream EGR gas relay passage 32 through which a front portion of the right surface (on the front side of the air-intake manifold 3) is in communication with the front surface. The EGR gas inlet of the recirculation exhaust gas tube 28 is in communication with the downstream EGR gas relay passage 32. The cylinder head 2 has the EGR cooler coupling bases 33, 34 which are formed by left and right edges of the front surface of the cylinder head 2 (a front-left corner portion and a front-right corner portion of the cylinder head 2) being protruded frontward. The upstream EGR gas relay passage 31 is provided inside the coupling base 33, and the downstream EGR gas relay passage 32 is provided inside the coupling base 34.

The EGR device 24 is coupled to the air-intake manifold 3 which is provided on the right surface of the cylinder head 2 so as to protrude therefrom. The air-intake manifold 3 is disposed in a portion of the right surface of the cylinder head 2, the portion being relatively close to the rear side (the cooling fan 9 side). The air-intake manifold 3 is formed by a lower portion of the right surface of the cylinder head 2 being protruded rightward. The air-intake manifold 3 has an intake inlet 40 at its middle portion with respect to the front-rear direction. An intake outlet 83 of the collector 25 of the EGR device 24 is coupled to the intake inlet 40 of the air-intake manifold 3 which protrudes from the right surface of the cylinder head 2, and the EGR device 24 is fixed to the right lateral side of the cylinder head 2.

On the front side (the flywheel housing 7 side) of the right surface of the cylinder head 2, the coupling base 34 coupled to the EGR cooler 27 protrudes frontward, and an EGR gas outlet of the downstream EGR gas relay passage 32 is opened in a right surface of the coupling base 34. One end of the recirculation exhaust gas tube 28 of the EGR device 24 is coupled to the right surface of the coupling base 34, and thereby the collector 25 of the EGR device 24 is in communication with the downstream EGR gas relay passage 32 provided inside the cylinder head 2 via the recirculation exhaust gas tube 28 and the EGR valve member 29.

On the rear side (the cooling fan 9 side) of the right surface of the cylinder head 2, the cooling water drainage (thermostat case) 35 whose upper surface is opened to communicate with a cooling water outlet pipe (thermostat cover) 23 protrudes rearward, and a thermostat (not shown) is installed therein. The cooling water drainage 35 is offset at the rear of the right surface of the cylinder head 2, and therefore it is possible that the V-belt 10 wound on a fan pulley 9a to which the cooling fan 9 is fixed extends through a space below the cooling water drainage 35. Thus, the length of the diesel engine 1 in the front-rear direction can be shortened. The cooling water drainage 35 also protrudes from the right surface of the cylinder head 2. On the right surface of the cylinder head 2, the air-intake manifold 3 and the cooling water drainage 35 are arranged one behind the other with respect to the front-rear direction.

On the front side (the flywheel housing 7 side) of the left surface of the cylinder head 2, the coupling base 33 coupled to the EGR cooler 27 protrudes frontward, and an EGR gas inlet of the upstream EGR gas relay passage 31 is opened in a left surface of the coupling base 33. That is, in the left surface of the cylinder head 2, the EGR gas inlet of the upstream EGR gas relay passage 31 and exhaust gas outlets of the plurality of exhaust gas passages 37 are disposed in the front-rear direction, and are opened. The exhaust gas manifold 4 has, in its right surface which is coupled to the left surface of the cylinder head 2, the EGR gas outlet 41 which is in communication with the upstream EGR gas relay passage 31 and exhaust gas inlets 42 which are in communication with the plurality of exhaust gas passages 37. The EGR gas outlet 41 and the exhaust gas inlets 42 are arranged in the front-rear direction, and are opened. Since the EGR inlet and the exhaust gas outlets are disposed side-by-side in the same surface of the cylinder head 2, it is easy for a coupling portion where the cylinder head 2 is coupled to the exhaust gas manifold 4 to obtain an airtightness (gas sealability) by sandwiching a single gasket 45 therebetween.

The exhaust gas manifold 4 is provided therein with an exhaust aggregate part 43 which is in communication with the EGR gas outlet 41 and the exhaust gas inlets 42. The exhaust aggregate part 43 is disposed such that its longitudinal direction is parallel to the front-rear direction. An exhaust gas outlet 44 which is in communication with the exhaust aggregate part 43 is opened in a rear portion of the left surface of the exhaust gas manifold 4. The exhaust gas manifold 4 is configured such that, after an exhaust gas coming from the exhaust gas passages 37 of the cylinder head 2 flows into the exhaust aggregate part 43 via the exhaust gas inlets 42, part of the exhaust gas serves as an EGR gas and flows into the upstream EGR gas relay passage 31 of the cylinder head 2 via the EGR gas outlet 41 while the rest of the exhaust gas flows into the two-stage turbocharger 30 via the exhaust gas outlet 44.

On the front surface of the cylinder head 2, the left and right pair of EGR cooler coupling bases 33, 34 are disposed on the exhaust gas manifold 4 side and on the air-intake manifold 3 side, respectively. The EGR cooler coupling base 33 has the upstream EGR gas relay passage 31 through which the EGR gas passage of the exhaust gas manifold 4 communicates with the EGR gas passage of the EGR cooler 27. The EGR cooler coupling base 34 has the downstream EGR gas relay passage 32 through which the EGR gas passage of the EGR device 24 communicates with the EGR gas passage of the EGR cooler 27. The EGR cooler coupling base 33 also has the downstream cooling water passage 38 to which cooling water is discharged from the EGR cooler 27. The EGR cooler coupling base 34 has the upstream cooling water passage 39 that supplies cooling water to the EGR device 24 and to the EGR cooler 27.

Since the EGR cooler coupling bases 33, 34 are configured in a protruding manner, there is no need for EGR gas piping that communicates the exhaust gas manifold 4, the EGR cooler 27, and the EGR device 24. Thus, the number of coupling portions of the EGR gas passage is small. Accordingly, in the diesel engine 1 that aims to reduce NOx by the EGR gas, EGR gas leakage can be reduced, and moreover deformation can be suppressed which may otherwise be caused by a change in a stress due to extension and contraction of piping. Since the EGR gas relay passages 31, 32 and the cooling water passages 38, 39 are provided in the EGR cooler coupling bases 33, 34, the shapes of the passages 31, 32, 38, 39 formed in the cylinder head 2 are simplified, so that the cylinder head 2 can be easily formed by casting without using a complicated core.

The EGR cooler coupling base 33 on the air-intake manifold 3 side and the EGR cooler coupling base 34 on the exhaust gas manifold 4 side are distant from each other. This can suppress a mutual influence between thermal deformations of the coupling bases 33, 34. Accordingly, gas leakage and damage of coupling portions where the EGR cooler coupling bases 33, 34 are coupled to the EGR cooler 27 can be suppressed or reduced, and in addition, a balance of the rigidity of the cylinder head 2 can be maintained. Moreover, the volume of the front surface of the cylinder head 2 can be reduced, which leads to weight reduction of the cylinder head 2. Furthermore, it is possible that the EGR cooler 27 is disposed at a distance from the front surface of the cylinder head 2, to provide a space on the front and rear sides of the EGR cooler 27. This enables cool air to flow around the EGR cooler 27, thus increasing the cooling efficiency of the EGR cooler 27.

In the EGR cooler coupling base 33, the downstream cooling water passage 38 is disposed above the upstream EGR gas relay passage 31. In the EGR cooler coupling base 34, the downstream EGR gas relay passage 32 is disposed above the upstream cooling water passage 39. A cooling water inlet of the downstream cooling water passage 38 and an EGR gas inlet of the downstream EGR gas relay passage 32 are disposed at the same height. A cooling water outlet of the upstream cooling water passage 39 and an EGR gas outlet of the downstream EGR gas relay passage 32 are disposed at the same height.

Since the EGR gas relay passages 31, 32 and the cooling water passages 38, 39 are provided in the EGR cooler coupling bases 33, 34 protruding at a distance from each other, a mutual influence between thermal deformations of the EGR cooler coupling bases 33, 34 is relieved. In the EGR cooler coupling bases 33, 34, the EGR gas flowing in the EGR gas relay passages 31, 32 is cooled by the cooling water flowing in the cooling water passages 38, 39, so that thermal deformations of the EGR cooler coupling bases 33, 34 are suppressed. In addition, the up-down positional relationship of the EGR gas relay passages 31, 32 and the cooling water passages 38, 39 in one of the EGR cooler coupling bases 33, 34 is reverse to that in the other of the EGR cooler coupling bases 33, 34. As a result, heat distributions in the respective EGR cooler coupling bases 33, 34 are in opposite directions with respect to the up-down direction, which can reduce an influence of thermal deformation in the height direction in the cylinder head 2.

An outer peripheral wall of the cylinder head 2 stands upward at a peripheral edge of the upper surface of the cylinder head 2, to provide a spacer 46 which is coupled to a peripheral edge of a lower surface of the head cover 18. That is, the spacer 46 is structured by the outer peripheral walls of left and right side walls 46a, 46b, and front and rear side walls 46c, 46d. Bolt holes (head cover coupling bolt holes) 135, in which cover fastening bolts 133 for coupling the head cover 18 are screwed, are bored in upper end surfaces (top portions) of the side walls 46a to 46d. Further, bolt through holes (cylinder head coupling through holes) 136, into which head fastening bolts 186 for coupling the cylinder block 6 are inserted, are bored in upper end surfaces (top portions) of the right side wall 46b and of the front and rear side walls 46c, 46d.

The spacer 46 has, in a right side wall 46a thereof, a plurality of openings 47. Fuel tubes 48 which couple the injectors 17 provided in the cylinder head 2 to the common rail 16 pass through the openings 47. Since the spacer 46 integrated with the cylinder head 2 is disposed above the cylinder head 2, the rigidity of the cylinder head 2 is increased, which can reduce distortion of the cylinder head 2 itself and also can allow component parts coupled to the cylinder head 2 to be supported with a high rigidity.

By coupling the head cover 18 onto the spacer 46 of the cylinder head 2 with the cover fastening bolts 133, a space covered by the spacer 46 and the head cover 18 serves as a rocker arm chamber, and the injectors 17 and a later-described valve gear structure 187 are accommodated in the rocker arm chamber. Within an area of the cylinder head 2 surrounded by the spacer 46, an injector mounting seat 138 to which the injector 17 is fixed, a valve gear structure mounting seat 139 to which the valve gear structure 187 is fixed, and a bolt fastening seat 140 to which the head fastening bolt 186 is fixed are provided to protrude upward from the bottom surface. Upper end surfaces of the valve gear structure mounting seat 139 and the bolt fastening seat 140 are set to be flush with the upper end surface of the spacer 46, and have the bolt through holes (cylinder head coupling through holes) 136 into which the head fastening bolts 186 are inserted.

The cylinder head 2 is fastened onto the cylinder block 6 using the head fastening bolts 186 inserted into bolt through holes 135 provided in the right side wall 46b and the front and rear side walls 46c, 46d of the spacer 46, the valve gear structure mounting seat 139, and the bolt fastening seat 140. The air-intake port 141 and the exhaust gas port 142 which are opened and closed by the air-intake valve 136 and the exhaust valve 137 are provided below the injector mounting seat 138 on the bottom surface of the cylinder head 2. Then, in the cylinder head 2, a plurality of air-intake passages 36 branched off from the air-intake manifold 3 on the right side portion of the cylinder head 2 extend towards the air-intake ports 141 below the injector mounting seat 138. Further, a plurality of exhaust gas passages 37 which are in communication with the exhaust gas manifold 4 fixed to the left side surface of the cylinder head 2 extend towards the exhaust gas ports 142 below the injector mounting seat 138.

The EGR cooler 27 is coupled to the front surface of the cylinder head 2, and the EGR gas relay passages (EGR gas passages) 31, 32 and the cooling water relay passages (cooling water passages) 37, 38 which are in communication with the EGR cooler 27, are provided in the coupling portion of the cylinder head 2 with the EGR cooler 27. The EGR cooler 27 is directly coupled to the cylinder head 2. Therefore, it is not necessary that cooling water piping and EGR gas piping are disposed between the EGR cooler 27 and the cylinder head 2. Therefore, the sealability of the coupling portion where the EGR cooler 27 is coupled can be achieved, without being affected by extension or contraction of the piping caused by the EGR gas or the cooling water. Further, the resistance (structural stability) of the cylinder head 2 against external fluctuation factors such as heat and vibration can be improved, and a compact structure can be achieved.

The cylinder head 2 has, in a standing manner, the spacer 46 formed by an outer peripheral wall surrounding an area ranging from a border with the air-intake manifold 3 to the coupling portion with the exhaust gas manifold 4 (an area structuring the rocker arm chamber). In the right side wall 46b and the front side wall 46c of the spacer 46, an L-shaped cooling water aggregate passage 143 serving as a cooling water passage is provided. The cooling water aggregate passage 143 is formed along the spacer 46 serving as the outer peripheral wall of the cylinder head 2, and the side walls 46b, 46c having the cooling water aggregate passage 143 is structured as a beam, which improves the rigidity of the cylinder head 2 against warpage. Therefore, when manufacturing the cylinder head 2 by casting, the warpage at the time of opening dies after casting is avoided.

The cylinder head 2 may be fastened and fixed above the cylinder block 6 by a plurality of head fastening bolts 186 inserted into the right side wall 46b and both front and rear side walls 46c, 46d of the spacer 46. At this time, the cooling water flowing into the cooling water aggregate passage 143 in the right side wall 46b and the front side wall 46c suppresses or reduces expansion (thermal deformation) of the head fastening bolt bolts 186 due to combustion heat of the cylinder and the like, and the cylinder head 2 can be connected to the cylinder block 6 with a high rigidity, so that the sealing performance of the cylinder is not lost. The cylinder head 2 is provided with a cooling water drainage 35 communicating with the cooling water aggregate passage 143 provided on the spacer 46, at a position adjacent to an end portion of the air-intake manifold 3 on the rear side surface.

That is, the upstream side of the cooling water aggregate passage 143 extends in the left-right direction along the front side wall 46c, and the left end portion (most upstream point) thereof is in communication with the downstream cooling water relay passage 38 provided to the EGR cooler coupling base 33 on the left side of the front side of the cylinder head 2. The downstream side of the cooling water aggregate passage 143 extends in the front-rear direction along the right side wall 46b, and the rear end portion (most downstream point) thereof is in communication with the cooling water drainage 35. Further, the cooling water aggregate passage 143 has its downstream side passage provided on the right side wall 46b branched towards the exhaust gas manifold 4, and communicated with a cooling water jacket 144 surrounding the air-intake passage 36, the exhaust gas passage 37, and the like. As a result, each of the cylinders can be evenly cooled in the cylinder head 2.

The cooling water jacket 144 is provided so as to surround the bolt through hole 135, below the valve gear structure mounting seat 139 and the bolt fastening seat 140, and cools the head fastening bolt 186 penetrating the cylinder head 2 and screwed to the cylinder block 6. Therefore, the cooling water flowing into the cooling water jacket 144 suppresses or reduces expansion (thermal deformation) of the head fastening bolt bolts 186 which may otherwise be caused by combustion heat of the cylinder or heat of the exhaust gas passing through the exhaust gas passage 37, and the cylinder head 2 can be connected to the cylinder block 6 with a high rigidity, so that the sealing performance of the cylinder is not lost.

The upstream cooling water relay passage 39 communicates with the front end portion of a cooling water rail 185 provided in the right side surface of the cylinder block 6, via the cooling water passages on the upper and lower sides. In the rear end portion of the cooling water rail 185, a cooling water inlet port 328 to which the cooling water is supplied from the cooling water pump 21 is provided. This way, the cooling water supplied from the cooling water pump 21 is supplied to the EGR cooler 27 through the cooling water rail 185 and the upstream cooling water relay passage 39.

The cooling water having passed the EGR cooler 27 flows into the cooling water aggregate passage 143 of the cylinder head 2, through the downstream cooling water relay passage 38. The cooling water passing the cooling water aggregate passage 143 is distributed to the cooling water jacket 144 provided for each of the cylinders in the cylinder head 2, thereby cooling each part of the cylinder head 2. The cooling water jacket 144 of the cylinder head 2 is in communication with a cooling water jacket 184 of the cylinder block 6, and the cooling water in the cooling water jacket 144 of the cylinder head 2 is discharged to the cooling water rail 185, after being supplied to the cooling water jacket 184 of the cylinder block 6.

Further, a cooling water drain passage 145 penetrating downward in the cooling water drainage 35 communicates with the cooling water recirculation passage 146 provided in a rear end surface side of the cylinder block 6. This way, a part of the cooling water having flown from the cooling water aggregate passage 143 of the cylinder head 2 into the cooling water drainage 35 returns to a pump suction port 334 of the cooling water pump 21, through the cooling water recirculation passage 146 of the cylinder block 6.

A configuration of the EGR device 24 will now be described with reference to FIG. 9 to FIG. 15, FIG. 22, and FIG. 23. As shown in FIG. 9 to FIG. 15, FIG. 22, and FIG. 23, the EGR device 24 includes a collector (main body case) 25 configured to mix the fresh air with the EGR gas and supply the mixed air to the air-intake manifold 3, and the air-intake manifold 3 and the air-intake throttle member 26 for introducing fresh air are connected in communication with each other through the collector 25. The EGR valve member 29 which leads to an outlet side of the recirculation exhaust gas tube 28 is connected in communication with the collector 25.

In the collector 25, a fresh air flow direction and an EGR gas flow direction cross each other perpendicularly or with an obtuse angle, and a direction in which a mixed gas of the EGR gas and the fresh air is taken into the air-intake manifold 3 intersects each of the fresh air flow direction and the EGR gas flow direction. A fresh air inlet 81 to which the fresh air is supplied is opened in one of front and rear surfaces of the collector 25, whereas an EGR gas inlet 82 to which the EGR gas is supplied is opened in the other of the front and rear surfaces of the collector 25. The intake outlet 83 which is coupled to the air-intake manifold 3 is opened in a left surface of the collector 25. The EGR gas inlet 82 and the intake outlet 83 are disposed at the same height, and the fresh air inlet 81 and the EGR gas inlet 82 are disposed at different heights.

In the collector 25, fresh air taken from the air-intake throttle member 26 into the fresh air inlet 81 flows in the front-rear direction and then in the up-down direction while curving in an L-shape, whereas an EGR gas taken from the EGR valve member 29 into the EGR gas inlet 82 flows obliquely upward. As a result, the EGR gas flows in toward a flow of the fresh air, which facilitates mixing of the EGR gas with the fresh air. The mixed gas of the fresh air and the EGR gas flows in the up-down direction and then in the left-right direction while curving in an L-shape, to flow into the air-intake manifold 3 through the intake outlet 83. A direction in which the mixed gas is emitted intersects not only the directions in which the fresh air and the EGR gas are taken in but also the directions in which the fresh air and the EGR gas flow within the collector 25. Consequently, a distribution of mixture of the EGR gas with the fresh air can be made uniform.

In the collector 25, as described above, the EGR gas flow direction is at an angle of 90° or more relative to the fresh air flow direction, and the fresh air flow and the EGR gas flow intersect each other, so that a distribution of mixture of the EGR gas with the fresh air can be made uniform, and an uneven flow of the EGR gas in the air-intake manifold 3 can be suppressed. As a result, a concentration of the EGR gas in the intake air supplied to each of the plurality of air-intake passages 36 of the cylinder head 2 can be made uniform. Thus, a variation in combustion action among cylinders of the diesel engine 1 can be suppressed. Consequently, generation of black smoke is suppressed, and the amount of NOx can be reduced while a good combustion state of the diesel engine 1 can be maintained. That is, purifying (cleaning) the exhaust gas by a recirculation flow of the EGR gas can be achieved without causing a misfire in a specific cylinder.

The collector 25 includes an upper case (first case) 84 with the fresh air inlet 81 and a lower case (second case) 85 with the EGR gas inlet 82 and the intake outlet 83 being coupled to each other. Since the collector 25 is divisible in the up-down direction into the upper case 84 and the lower case 85, a mixed passage where the EGR gas flow and the fresh air flow intersect each other at an angle of 90° or more can be easily formed in the collector 25. It is therefore possible that the collector 25 is formed as a casting with a high rigidity, and moreover, weight reduction of the collector 25 can be obtained by forming the collector 25 as an aluminum-based casting product.

The upper case 84 is provided therein with a downstream EGR gas passage (first EGR gas passage) 86a which is a part of the EGR gas passage 86 where the EGR gas flows and a mixing chamber 87 in which the fresh air and the EGR gas are mixed. The lower case 85 is provided therein with an upstream EGR gas passage (second EGR gas passage) 86b through which the downstream EGR gas passage 86a is in communication with the EGR gas inlet 82 and a mixed gas passage 88 through which a mixed gas obtained by mixing the fresh air with the EGR gas is supplied from the mixing chamber 87 to the air-intake manifold 3.

The EGR gas inlet 82 is disposed in the lower case 85 while the fresh air inlet 81 and the mixing chamber 87 are disposed in the upper case 84. In the mixing chamber 87, therefore, the fresh air flowing from the fresh air inlet 81 and the EGR gas flowing from the lower case 85 intersect each other, so that the fresh air and the EGR gas can be efficiently mixed. In addition, the intake outlet 83 is disposed in the lower case 85, and the fresh air having entered the upper case 84 tends to flow toward the lower case 85. As a result, mixing of the EGR gas flowing toward the upper case 84 with the fresh air is made uniform. Furthermore, each of the EGR gas passage 86, the mixing chamber 87, and the mixed gas passage 88 can be compactly configured within the collector 25, and thus the collector 25 can be downsized.

In a plan view, the downstream EGR gas passage 86a is coupled with an offset to a side surface (right side surface) of the mixing chamber 87 opposite to a side surface (left side surface) thereof having the intake outlet 83 relative to a central axis of the mixing chamber 87, and the downstream EGR gas passage 86a and the upstream EGR gas passage 86b are in communication with each other so that the EGR gas passage 86 is formed in a spiral manner. The EGR gas passage 86 composed of the downstream EGR gas passage 86a and the upstream EGR gas passage 86b has a bent shape curved toward the side (right side) opposite to the intake outlet 83 in a plan view. A bottom of the upstream EGR gas passage 86b is constituted by a slope (a slope inclined upward toward the rear) extending from the EGR gas inlet 82 toward the upper case 84.

A portion of the mixing chamber 87 that is in communication with the EGR gas passage 86 is on the side opposite to the intake outlet 83. The EGR gas flowing into the mixing chamber 87, therefore, reaches the intake outlet 83 while being guided by a fresh air flow, which allows the EGR gas to be uniformly mixed with the fresh air. The EGR gas flowing from the EGR gas passage 86 into the mixing chamber 87 flows in a direction against the direction from the mixing chamber 87 toward the mixed gas passage 88. This causes the fresh air and the EGR gas to collide with each other while flowing within the mixing chamber 87. Accordingly, the EGR gas is smoothly mixed with the fresh air.

Since the EGR gas flows along the EGR gas passage 86 having a spiral shape, the EGR gas creates a swirling flow having a clockwise vortex when flowing into the mixing chamber 87. Such a turbulent EGR gas flows in a direction against the fresh air gas flow. Thus, simultaneously with flowing into the mixing chamber 87, the EGR gas is smoothly mixed with the fresh air flowing within the mixing chamber 87. In the collector 25, therefore, the fresh air and the EGR gas can be efficiently mixed (the EGR gas can be smoothly dispersed in the mixed gas) by agitation before they are fed to the air-intake manifold 3, so that a variation (unevenness) in the gas mixing state within the collector 25 can be suppressed more reliably. As a result, a mixed gas having less unevenness can be distributed to the respective cylinders of the diesel engine 1, and a variation in the EGR gas amount among the cylinders can be suppressed. Accordingly, it is possible to suppress generation of black smoke, and to reduce the amount of NOx while maintaining a good combustion state of the diesel engine 1. In addition, the EGR gas passage 86 having a spiral shape gives sufficient swirling properties to the EGR gas flowing into the mixing chamber 87. Thus, the collector 25 can be shaped with a shortened length in the front-rear direction.

A lower surface flange 84a of the upper case 84 and an upper surface flange 85a of the lower case 85 are fastened with bolts, to form the collector 25 having openings (the fresh air inlet 81, the EGR gas inlet 82, and the intake outlet 83) in three directions (toward the front, rear, and left). The upper case 84 has a rear surface flange 84b in which the fresh air inlet 81 is opened, and a fresh air outlet of the air-intake throttle member 26 is fastened to the rear surface flange 84b with bolts. The air-intake throttle member 26 adjusts the degree of opening of an air-intake valve (butterfly valve) 26a provided therein, to thereby adjust the amount of fresh air supply to the collector 25.

The lower case 85 has a front surface flange 85b in which the EGR gas inlet 82 is opened, and an EGR gas outlet of the EGR valve member 29 is fastened with bolts to the front surface flange 85b with interposition of a relay flange 89 having a rectangular pipe shape. The EGR valve member 29 adjusts the degree of opening of an EGR valve (not shown) provided therein, to thereby adjust the amount of EGR gas supply to the collector 25. A reed valve 90 inserted in the EGR gas inlet 82 is fixed inside the front surface flange 85b of the lower case 85. The relay flange (spacer) 89 which is fastened to the front surface flange 85b with bolts covers the front side of the reed valve 90. As a result, the collector 25 is provided therein with the reed valve 90 disposed in a portion of the EGR gas passage 86, the portion being on the EGR gas inlet 82 side.

The relay flange 89 has, in its rear surface coupled to the collector 25, an EGR gas outlet 89a which is in communication with the EGR gas inlet 82. The relay flange 89 has a front surface from which valve coupling bases 89b, 89c to be coupled to the EGR valve member 29 protrude. Openings of the valve coupling bases 89b, 89c are in communication with the EGR gas outlet of the EGR valve member 29. In the relay flange 89, the EGR gas is merged at EGR gas inlets of the upper and lower valve coupling bases 89b, 89c, and then is caused to flow from the EGR gas inlet 82 into the EGR gas passage 86 provided inside the collector 25 via the reed valve 90.

The EGR valve member 29 is configured such that: a valve body 29e has an EGR gas passage 29f in which an EGR valve (not shown) is disposed; an actuator 29d for adjusting the degree of opening of the EGR valve is disposed above the valve body 29e; the EGR valve member 29 has its longitudinal direction in parallel to the up-down direction; and the EGR valve member 29 is coupled to the front side of the collector 25 with interposition of the relay flange 89. The EGR valve member 29 has, in a rear surface of the valve body 29e which is arranged lower, outlet side flanges 29a, 29b to be coupled respectively to the valve coupling bases 89b, 89c of the relay flange 89. The outlet side flanges 29a, 29b are arranged one above the other. The EGR valve member 29 also has, in its front surface, an inlet side flange 29c having an EGR gas inlet that is in communication with the EGR gas outlet of the recirculation exhaust gas tube 28.

The EGR valve member 29 is configured such that: after an EGR gas cooled by the EGR cooler 27 flows into the EGR gas inlet of the inlet side flange 29c through the downstream EGR gas relay passage 32 of the EGR cooler coupling base 34 and the recirculation exhaust gas tube 28, the EGR gas is distributed to upper and lower parts via the EGR gas passage 29f of the valve body 29e. The EGR gas flow distributed to upper and lower parts through the EGR gas passage 29f is then subjected to a flow rate adjustment by the EGR valve, and then enters the relay flange 89 through the EGR gas outlets of the upper and lower outlet side flanges 29a, 29b.

The recirculation exhaust gas tube 28 includes a gas pipe portion 28a and a rib 28b, the gas pipe portion 28a being bent to have an L-shape in a plan view, the rib 28b having a flat-plate shape protruding from an inner peripheral side of an outer wall of the gas pipe portion 28a. The recirculation exhaust gas tube 28 has, at one end (rear end) of the gas pipe portion 28a, an outlet side flange 28c to be coupled to the inlet side flange 29c of the EGR valve member 29, and also has, at the other end (left end) of the gas pipe portion 28a, an inlet side flange 28d to be coupled to the right surface of the EGR cooler coupling base 34. The recirculation exhaust gas tube 28 further has, in an upper surface of a bent portion of the gas pipe portion 28a, a sensor attachment base 28e to which an EGR gas temperature sensor is attached.

In the EGR device 24, the collector 25 can be configured with a shortened length, and therefore the distance between the EGR valve member 29 and the air-intake throttle member 26 can be shortened, which enables the length of the EGR device 24 in the front-rear direction to be shortened. In the EGR valve member 29, the actuator 29d is disposed on the upper side. It is therefore possible that topmost portions of the EGR valve member 29, the collector 25, and the air-intake throttle member 26 are at the same height. This can lower the height of the EGR device 24 in the up-down direction, and also can narrow the width of the EGR device 24 in the left-right direction. Since the EGR device 24 can be configured compactly, coupling the EGR device 24 to the right side of the cylinder head 2 integrated with the air-intake manifold 3 can be easily implemented merely by adjusting the recirculation exhaust gas tube 28. In addition, such a configuration contributes to downsizing of the diesel engine 1.

The recirculation exhaust gas tube 28 has the flat-plate rib 28b that is coupled so as to connect the opposite ends of the gas pipe portion 28a. This gives a high rigidity to the recirculation exhaust gas tube 28, and also increases a strength with which the front end side of the EGR device 24 is supported on the cylinder head 2. In addition, the recirculation exhaust gas tube 28 has the flat-plate rib 28b that is disposed along an EGR gas passage 28f provided inside the gas pipe portion 28a. Due to the rib 28b, the gas pipe portion 28a has a wide heat dissipation area, which increases the cooling effect for the EGR gas flowing in the EGR gas passage 28f. This contributes to cooling a mixed gas prepared in the EGR device 24, and an effect of reduction in the amount of NOx generated from the mixed gas can be easily kept in a proper state.

A configuration of the EGR cooler 27 will now be described with reference to FIG. 9 to FIG. 16, and FIG. 24 to FIG. 26. As shown in FIG. 9 to FIG. 16, and FIG. 24 to FIG. 26, the EGR cooler 27 includes a heat exchanger 91 and a pair of left and right flange parts 92, 93. The heat exchanger 91 has a cooling water passage and an EGR gas passage alternately stacked. The pair of left and right flange parts 92, 93 are disposed in left and right end portions of one side surface of the heat exchanger 91. A cooling water outlet 94 is disposed in one of the left and right flange portions 92, 93, while a cooling water inlet 95 is disposed in the other of the left and right flange portions 92, 93. An EGR gas inlet 96 is disposed in one of the left and right flange parts 92, 93, while an EGR gas outlet 97 is disposed in the other of the left and right flange parts 92, 93. The left and right flange parts 92, 93 are coupled to the front surface of the cylinder head 2, so that the EGR cooler 27 is fixed to the cylinder head 2.

Since each of the pair of left and right flange parts 92, 93 has a cooling water opening and an EGR gas opening, it is possible that the flange parts 92, 93 are made from a common member, and moreover material costs of the flange parts 92, 93 can be suppressed. The flange parts 92, 93 are formed by a flat plate being bored to have through holes 94 to 97 corresponding to the cooling water and the EGR gas, the flat plate being coupled to the cylinder head 2. Thus, forming the flange parts 92, 93 in the EGR cooler 27 is easy. In addition, a coupling portion where the flange parts 92, 93 are coupled to the heat exchanger 91 can be minimized, so that the amount of heat transfer from the cylinder head 2 to the heat exchanger 91 can be reduced, which increases the cooling effect for the EGR gas by the heat exchanger 91.

Since the EGR cooler 27 has the flange parts 92, 93 protruding from the rear surface of the heat exchanger 91, a space is formed between the heat exchanger 91 and the cylinder head 2. As a result, the EGR cooler 27 is in a state where a wide area of the front and rear surfaces of the heat exchanger 91 is exposed to outside air. Heat dissipation occurs in the heat exchanger 91, too. Thus, the cooling effect for the EGR gas by the EGR cooler 27 is increased. This configuration can reduce the degree of stacking in the heat exchanger 91 as compared to a configuration in which the rear surface and the front surface of the heat exchanger 91 are attached. The length of the EGR cooler 27 in the front-direction can be shorted, and thus the diesel engine 1 can be downsized.

The left flange part 92 has the cooling water outlet 94 and the EGR gas inlet 96, while the right flange part 93 has the cooling water inlet 95 and the EGR gas outlet 97. In the left flange part 92, the cooling water outlet 94 is disposed above the EGR gas inlet 96, while in the right flange part 93, the EGR gas outlet 97 is disposed above the cooling water inlet 95. The cooling water outlet 94 and the EGR gas outlet 97 are disposed at the same height, while the cooling water inlet 95 and the EGR gas inlet 96 are disposed at the same height.

The left and right flange parts 92, 93 of the EGR cooler 27 are coupled respectively to the EGR cooler coupling bases 33, 34 protruding from the front surface of the cylinder head 2. The upstream EGR gas relay passage 31 and the downstream cooling water relay passage 38 of the left EGR cooler coupling base 33 are in communication with the EGR gas inlet 96 and the cooling water outlet 94 of the left flange part 92, respectively. The downstream EGR gas relay passage 32 and the upstream cooling water relay passage 39 of the right EGR cooler coupling base 34 are in communication with the EGR gas outlet 97 and the cooling water inlet 95 of the right flange part 93, respectively.

The EGR gas relay passages 31, 32 and the cooling water passages 38, 39 are provided in the coupling bases 33, 34 to which the flange parts 92, 93 of the EGR cooler 27 are coupled, and the flange parts 92, 93 are in communication with the EGR gas inlet and outlet 96, 97 and the cooling water outlet and inlet 94, 95. It is not necessary that cooling water piping and EGR gas piping are disposed between the EGR cooler 27 and the cylinder head 2. Accordingly, a sealability can be given to a coupling portion where the EGR cooler 27 and the cylinder head 2 are coupled to each other without any influence of, for example, extension and contraction of piping caused by the EGR gas or the cooling water. In addition, the EGR cooler 27 is given an enhanced resistance against external fluctuation factors such as heat and vibration, and can be compactly installed in the cylinder head 2.

The cooling water outlet 94 is disposed above the EGR gas inlet 96 in the flange part 92, while the EGR gas outlet 97 is disposed above the cooling water inlet 95 in the flange part 93. Thus, the flange parts 92, 93 having identical shapes with their postures mutually upside-down are attached to the heat exchanger 91. This can reduce the number of types of component parts included in the EGR cooler 27, thus improving an assemblability of the EGR cooler 27 and reducing costs of the component parts.

The flange part 92 is provided with the cooling water outlet 94 and the EGR gas inlet 96 through which cooling water or an EGR gas having a large quantity of heat passes, while the flange part 93 is provided with the cooling water inlet 95 and the EGR gas outlet 97 through which cooling water or an EGR gas having a small quantity of heat passes. Accordingly, distortion caused by thermal deformation of each of the flange parts 92, 93 can be suppressed. In addition, the flange parts 92, 93 are configured as separate members whose thermal deformation is less influential to each other, and therefore damage and breakdown of the EGR cooler 27 can be suppressed or reduced.

In the EGR cooler 27, the cooling water outlet 94 and the cooling water inlet 95 are disposed at diagonal positions, and the EGR gas inlet 96 and the EGR gas outlet 97 are disposed at diagonal positions in a rear view. Since EGR gas having different quantities of heat and cooling water having different quantities of heat are respectively supplied or discharged at diagonal positions, thermal deformations of coupling portions where the EGR cooler 27 is coupled to the cylinder head 2 can be mutually relieved, so that deflection or slackness of the coupling portions can be suppressed. Accordingly, leakage of an EGR gas or cooling water in the EGR cooler 27 and in the cylinder head 2 can be suppressed or reduced, and moreover a decrease in the coupling strength can be suppressed or reduced.

A plate-shaped gasket 98 is sandwiched between the cylinder head 2 and the flange parts 92, 93 so as to extend across the left and right flange parts 92, 93. A cooling water inlet and a cooling water outlet of the cylinder head 2, which are respectively in communication with the cooling water outlet 94 and the cooling water inlet 95 of the flange parts 92, 93, have O-rings 99 embedded therein, the O-rings 99 being ring-shape seal members. The O-rings 99 are covered with the flange parts 92, 93.

Since the flange parts 92, 93 configured as separate members are coupled to the coupling bases 33, 34 of the cylinder head 2 with the gasket 98 interposed therebetween, a tension is exerted on the gasket 98 due to thermal deformation of the coupling portion coupled to the cylinder head 2. This enhances a sealability (hermetic sealing performance) of the gasket 98 in a coupling portion of each of the EGR gas inlet 96 and the EGR gas outlet 97. Thus, leakage of an EGR gas flowing from one to the other between the cylinder head 2 and the EGR cooler 27 can be suppressed or reduced. The O-rings 99 are embedded in spaces defined by rear end surfaces of the flange parts 92, 93 and the cooling water inlet and the cooling water outlet of the coupling bases 33, 34 of the cylinder head 2. When cooling water flows, therefore, the cooling water is in contact with the O-rings 99 in communication portions where the coupling bases 33, 34 are in communication with the flange parts 92, 93. Thus, a sealability (hermetic sealing performance) of the coupling portions of the cooling water outlet and inlet can be obtained. Accordingly, even though the EGR cooler 27 where a liquid and a gas enter and exit is coupled to the cylinder head 2, a sealability for each of the liquid and the gas can be obtained, so that leakage of each of the EGR gas and the cooling water can be suppressed or reduced.

An outer peripheral portion of each of the flange parts 92, 93 is bored to have through holes 100 for bolt fastening, at outer positions. Specifically, the left flange part 92 has five through holes 100 disposed in its upper, lower, and left sides, and the right flange part 93 has five through holes 100 disposed in its upper, lower, and right sides. Since the left flange part 92 has the through holes 100 disposed above the cooling water outlet 94, below the EGR gas inlet 96, and to the left of a portion between the cooling water outlet 94 and the EGR gas inlet 96, a sealability of the cooling water outlet 94 and the EGR gas inlet 96 can be exerted when the left flange part 92 is fastened to the coupling base 33 of the cylinder head 2 with bolts. Likewise, since the right flange part 93 has the through holes 100 disposed below the cooling water inlet 95, above the EGR gas outlet 97, and to the right of a portion between the cooling water inlet 95 and the EGR gas outlet 97, a sealability of the cooling water inlet 95 and the EGR gas outlet 97 can be exerted when the right flange part 93 is fastened to the coupling base 34 of the cylinder head 2 with bolts.

The gasket 98 is constituted by a lamination of two plates 98a, 98b each having through holes 101 to 103. The EGR gas passes through the through holes (EGR gas through holes) 101. The cooling water passes through the through holes (cooling water through holes) 102. Fastening bolts are inserted into the through holes (bolt through holes) 103. The gasket 98 has such a shape that an inner peripheral edge at the EGR gas through hole 101 is branched so as to be warped in the front-rear direction and is configured such that the opening areas of the cooling water through holes 102 are larger than the opening areas of the cooling water outlet and inlet 94, 95.

In the gasket 98, the front plate 98a has its inner peripheral edge at the EGR gas through hole 101 being warped frontward, while the rear plate 98b has its inner peripheral edge at the EGR gas through hole 101 being warped rearward. The front plate 98a and the rear plate 98b are bonded by welding, so that the inner peripheral edge at the EGR gas through hole 101 has a Y-shaped cross-section. Since the inner peripheral edge at the EGR gas through hole 101 is warped in the front-rear direction, front and rear surfaces of the inner peripheral edge at the EGR gas through hole 101 can be in tight contact with end surfaces of the coupling bases 33, 34 and the flange parts 92, 93. Accordingly, a sufficient airtightness can be obtained.

The gasket 98 is configured such that the openings of the cooling water through holes 102 is larger than those of the cooling water outlet and inlet 94, 95. Thus, the O-rings 99 are inserted in the cooling water through holes 102. Communication portions where the cooling water outlet and inlet of the flange parts 92, 93 are in communication with the cooling water relay passages 38, 39 of the coupling bases 33, 34 are hermetically sealed by the O-rings 99 fitted in the cooling water through holes 102 of the gasket 98.

The coupling bases 33, 34 of the cylinder head 2 have the cooling water outlet and inlet opened with steps, and thereby the openings of the cooling water outlet and inlet are given larger diameters than the passage diameters of the cooling water relay passages 38, 39 formed inside the coupling bases 33, 34. The O-rings 99 disposed to the cooling water outlet and inlet of the coupling bases 33, 34 are fitted on the outer circumferential sides of the cooling water relay passages 38, 39. The O-rings 99 are inserted in the gasket 98, and also fitted in the stepwise portion of the cooling water outlet and inlet in the coupling bases 33, 34. Thereby, the O-rings 99 are sandwiched between the coupling bases 33, 34 and the flange parts 92, 93. When cooling water passes inside the O-rings 99 made of an elastic material, the O-rings 99 are deformed to expand outward and come into tight contact with the coupling bases 33, 34 and the flange parts 92, 93, thus providing a sealability for the cooling water.

The ring-shape O-ring has its inner circumferential portion bulging frontward and rearward. Cooling water passing through the inner circumferential portion of the O-ring 99 pushes the inner circumferential portion, so that its front and rear edges are deformed to protrude frontward and rearward. This brings the inner circumferential portion of the O-ring 99 into tight contact with the coupling bases 33, 34 and the flange parts 92, 93. Thus, a sealability for the cooling water can be enhanced in the coupling portion where the cylinder head 2 is coupled to the EGR cooler 27.

The ring-shape O-ring 99 whose inner circumferential portion is bulged frontward and rearward is shaped such that its inner circumferential surface has a recessed portion. That is, the inner circumferential surface of the O-ring 99 is warped frontward and rearward so as to have a Y-shaped cross-section. Thus, cooling water passing through the inner circumferential portion of the O-ring 99 pushes the inner circumferential portion, so that its front and rear edges are further protruded frontward and rearward, to increase the degree of tight contact of the inner circumferential portion of the O-ring 99 with the coupling bases 33, 34 and the flange parts 92, 93. Accordingly, a sealability for the cooling water can be enhanced in the coupling portion where the cylinder head 2 is coupled to the EGR cooler 27. The inner circumferential surface of the O-ring is warped frontward and rearward so as to have a Y-shaped cross-section.

Figure 17:
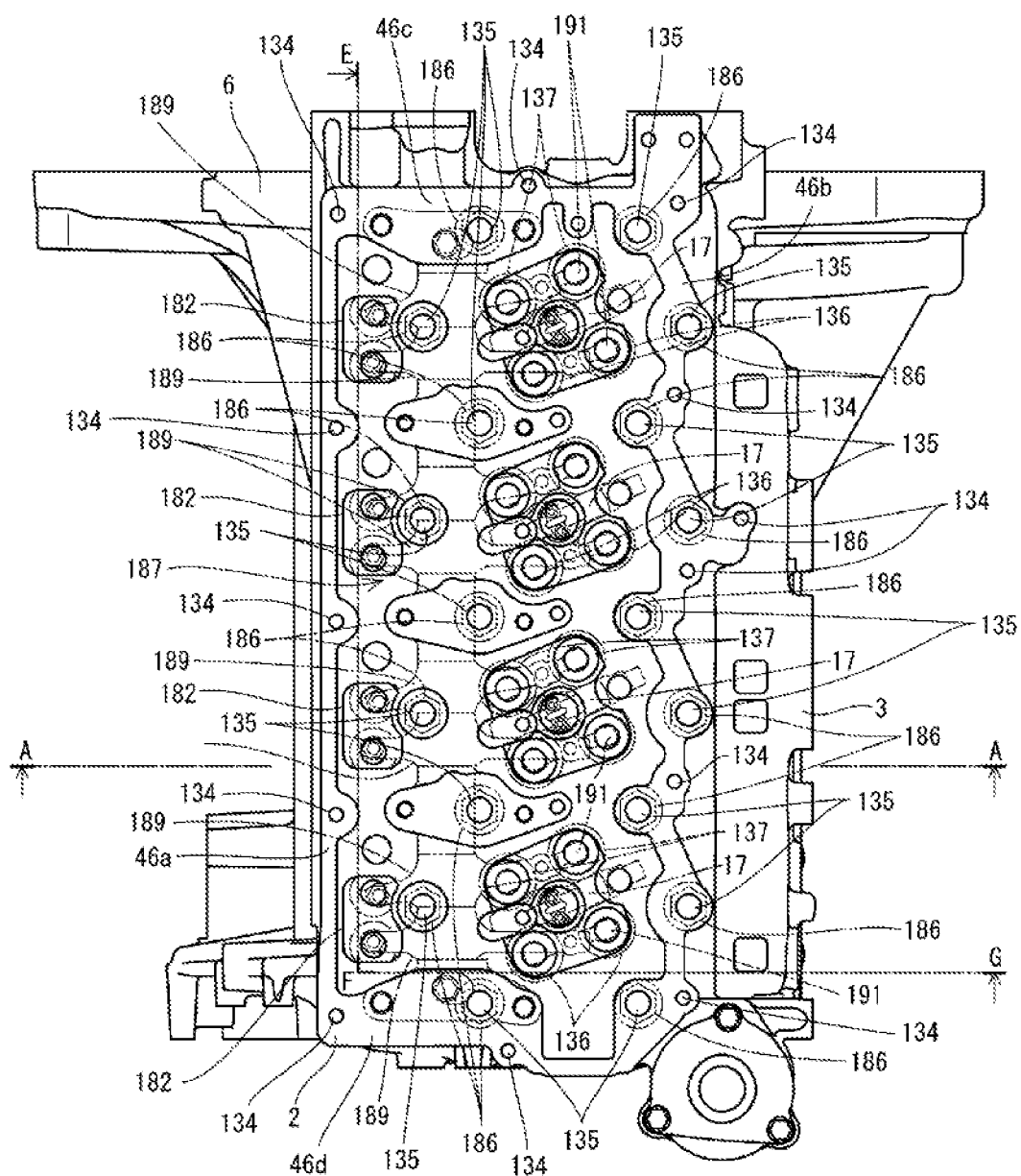
FIG. 17 A schematic plan view showing the cylinder head and the cylinder block.
Figure 18:
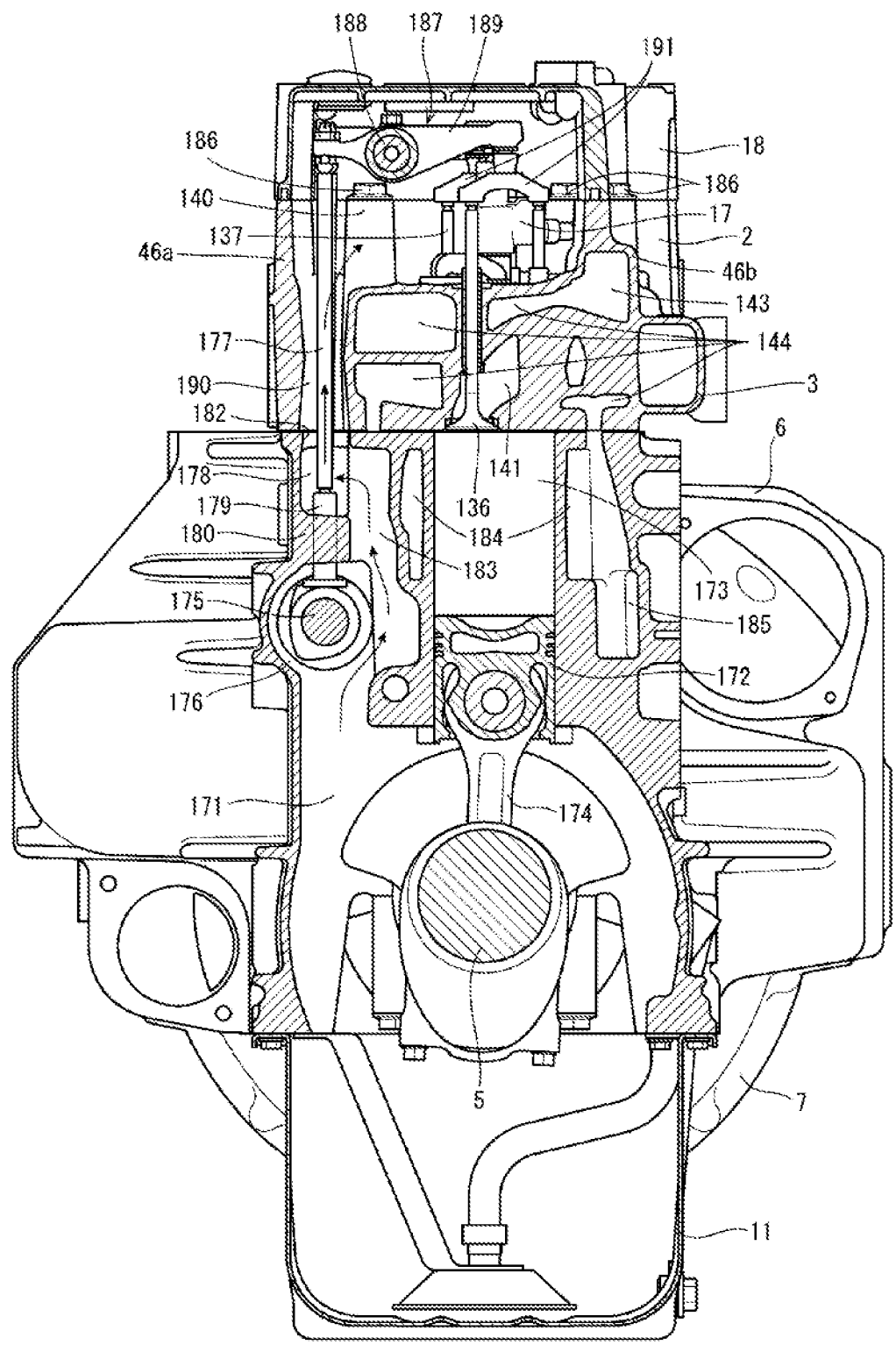
FIG. 18 A schematic cross-sectional view as taken at A-A of FIG. 17.
Figure 19:
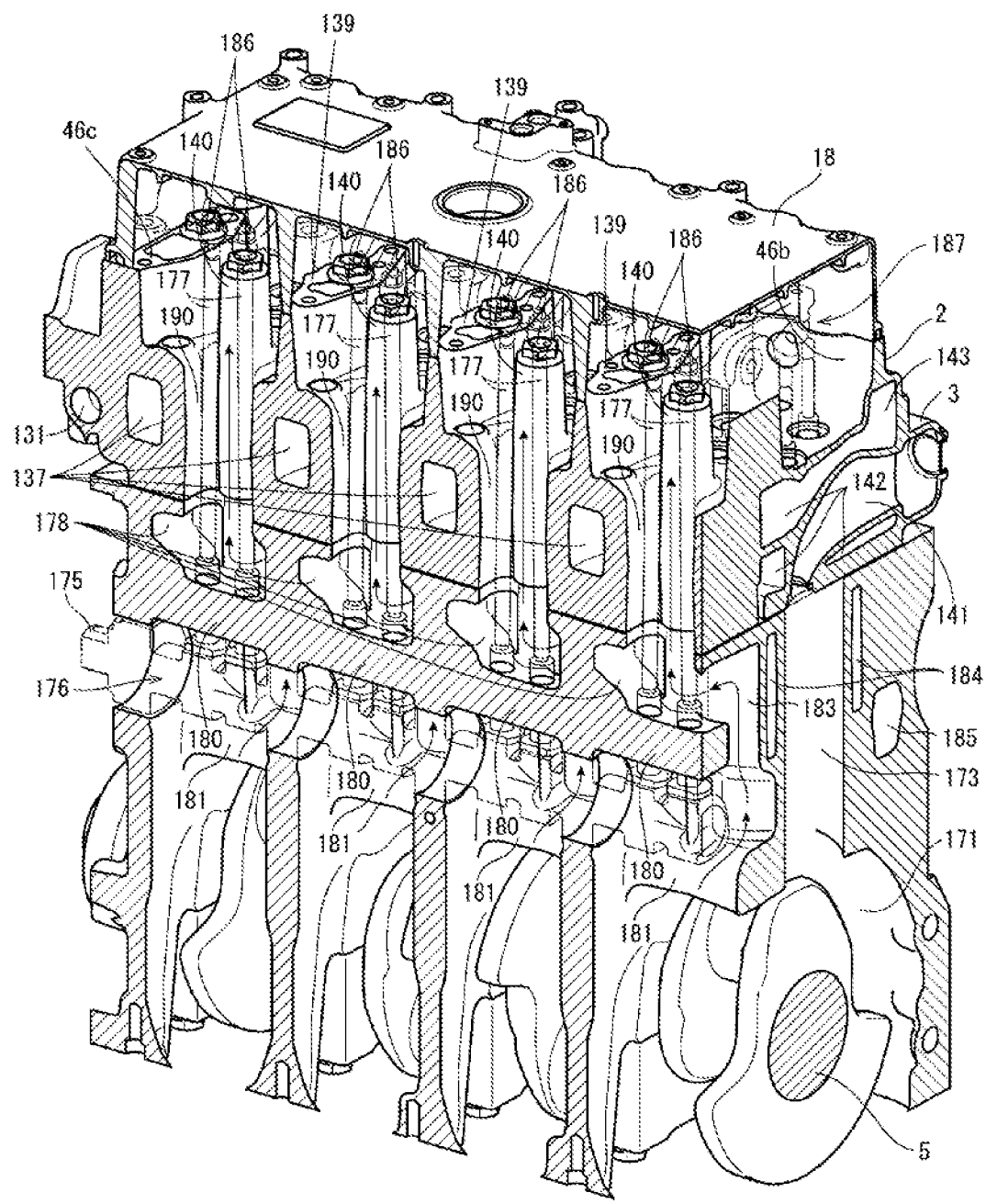
FIG. 19 A schematic perspective cross-sectional view as taken at E-F-G of FIG. 17.
Figure 20:
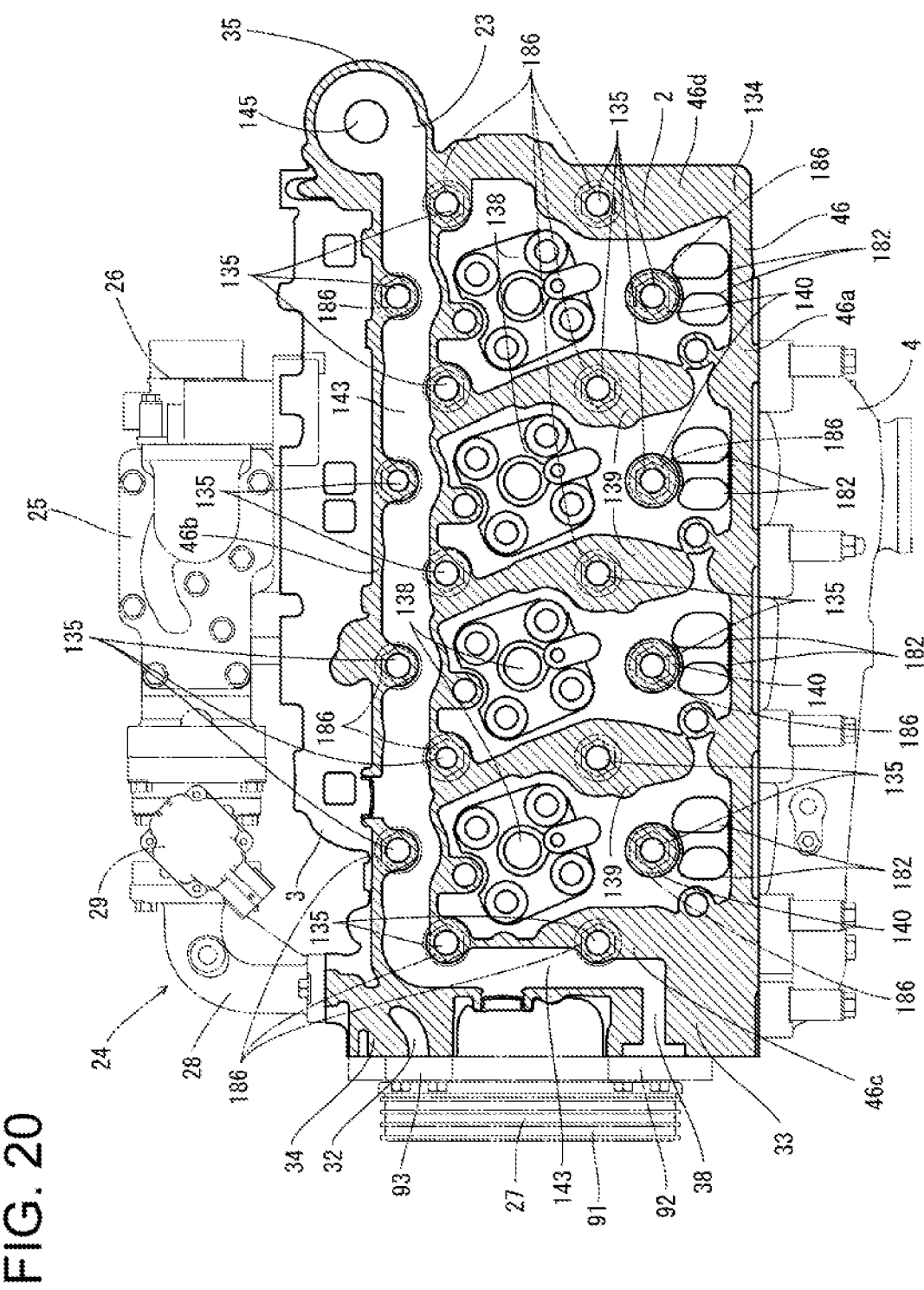
FIG. 20 A cross-sectional plan view showing a structure of a cooling water path of the cylinder head.
Figure 21:
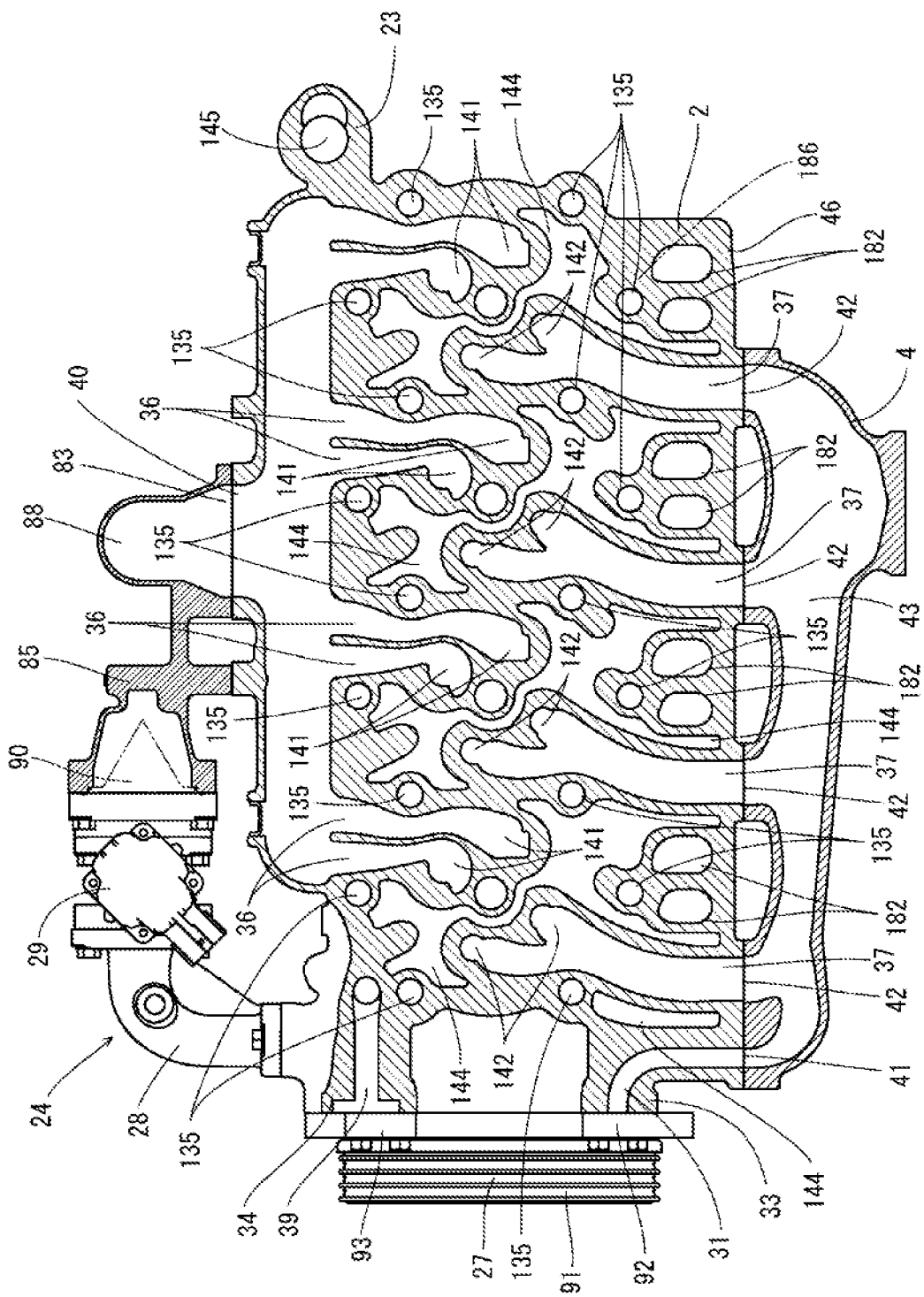
FIG. 21 A cross-sectional plan view showing a structure of the exhaust gas passage and the air-intake passage in the cylinder head.
Figure 22:
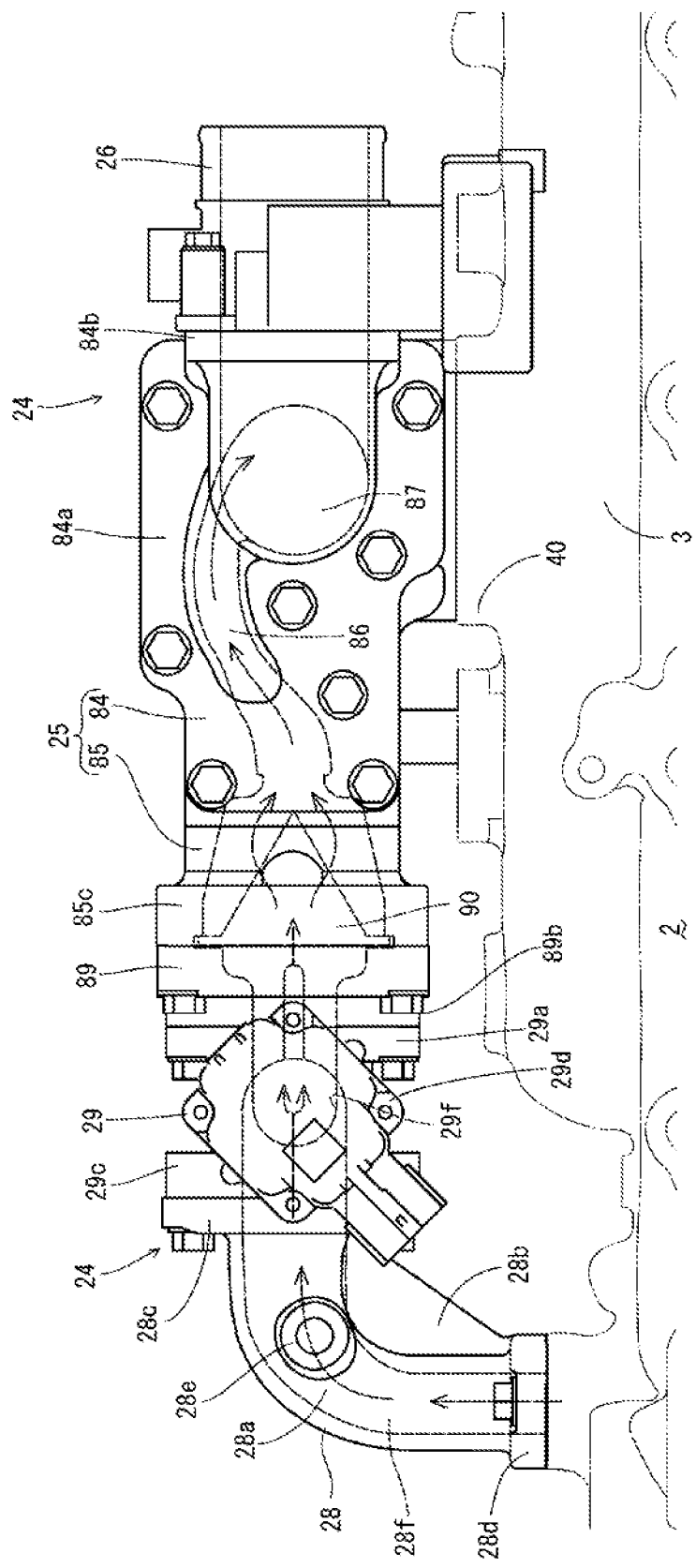
FIG. 22 A top plan view of the EGR device.
Figure 23:
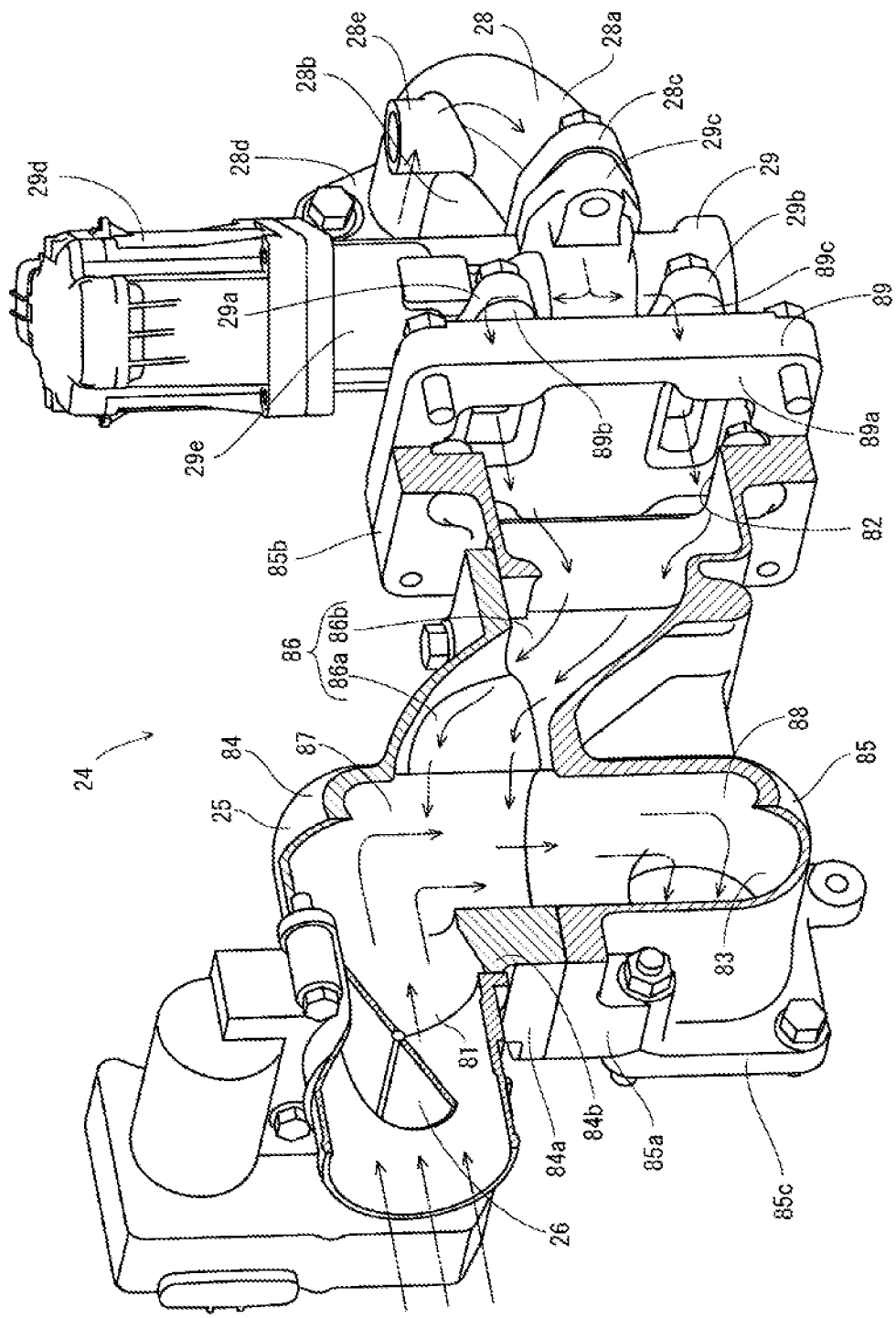
FIG. 23 A perspective cross-sectional view of the EGR device.
Figure 24:
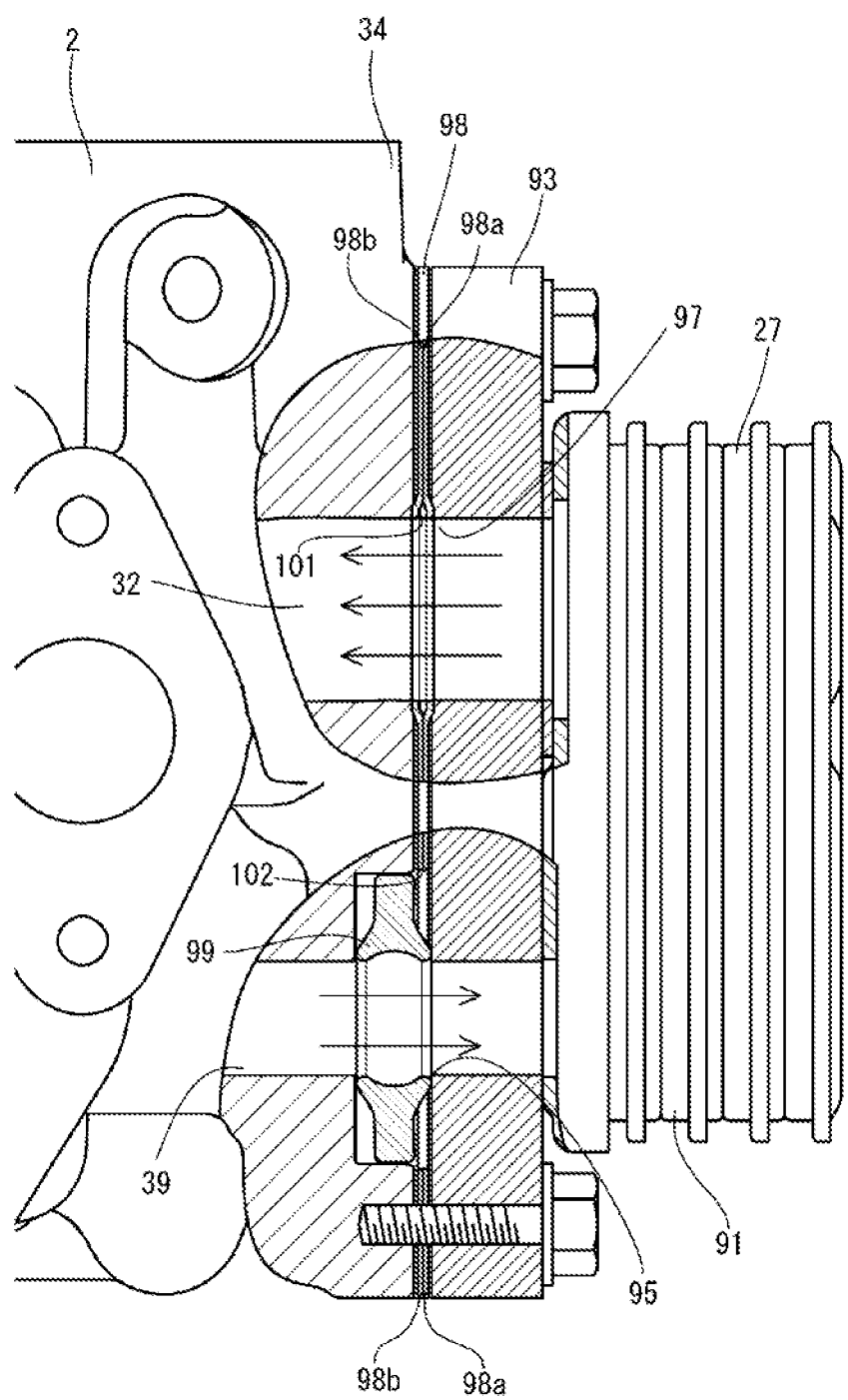
FIG. 24 A cross-sectional view of the coupling portion of the cylinder head coupled to the EGR cooler.
Figure 25:
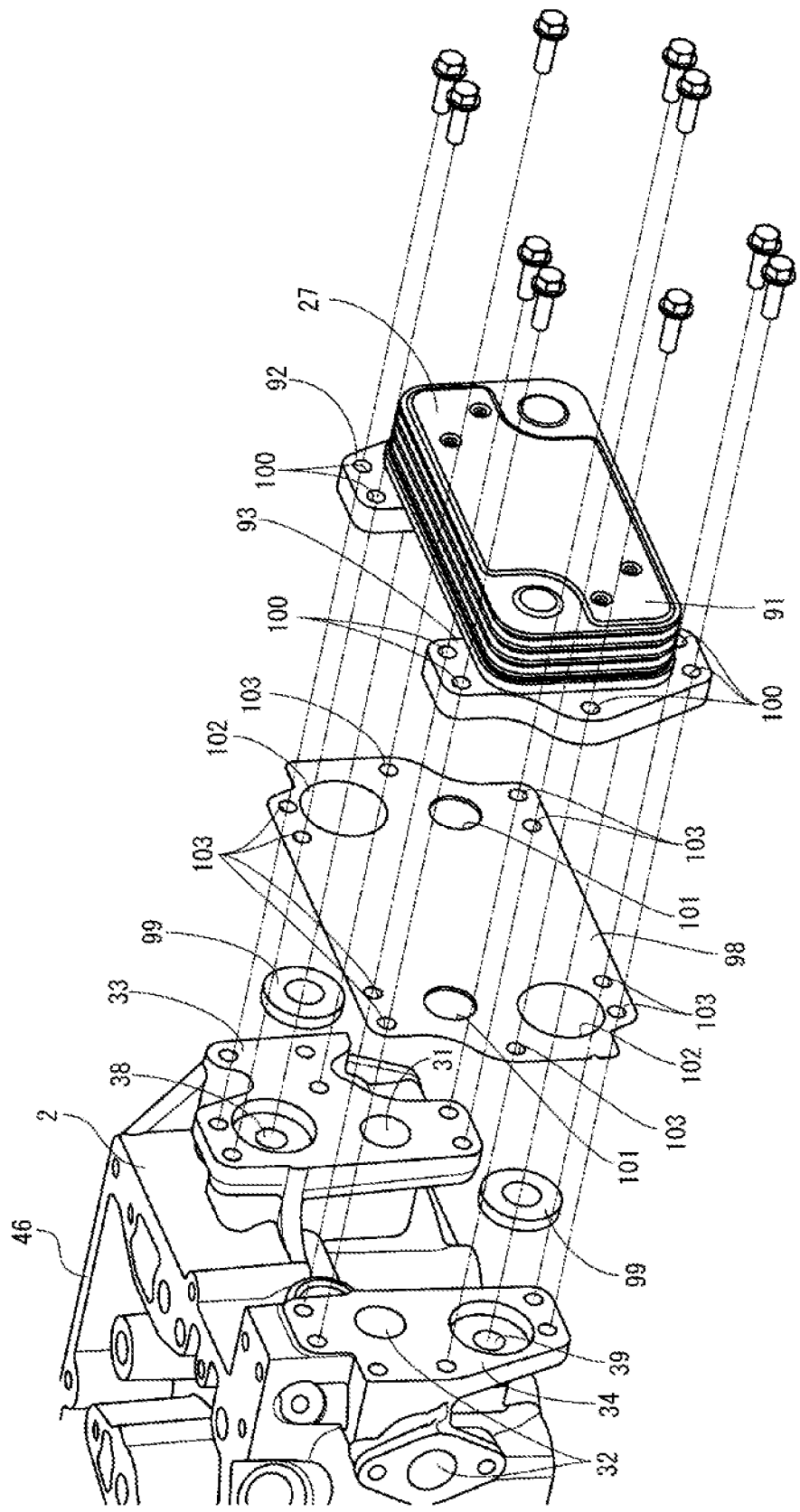
FIG. 25 An exploded view of the coupling portion of the cylinder head coupled to the EGR cooler.
Figure 26:
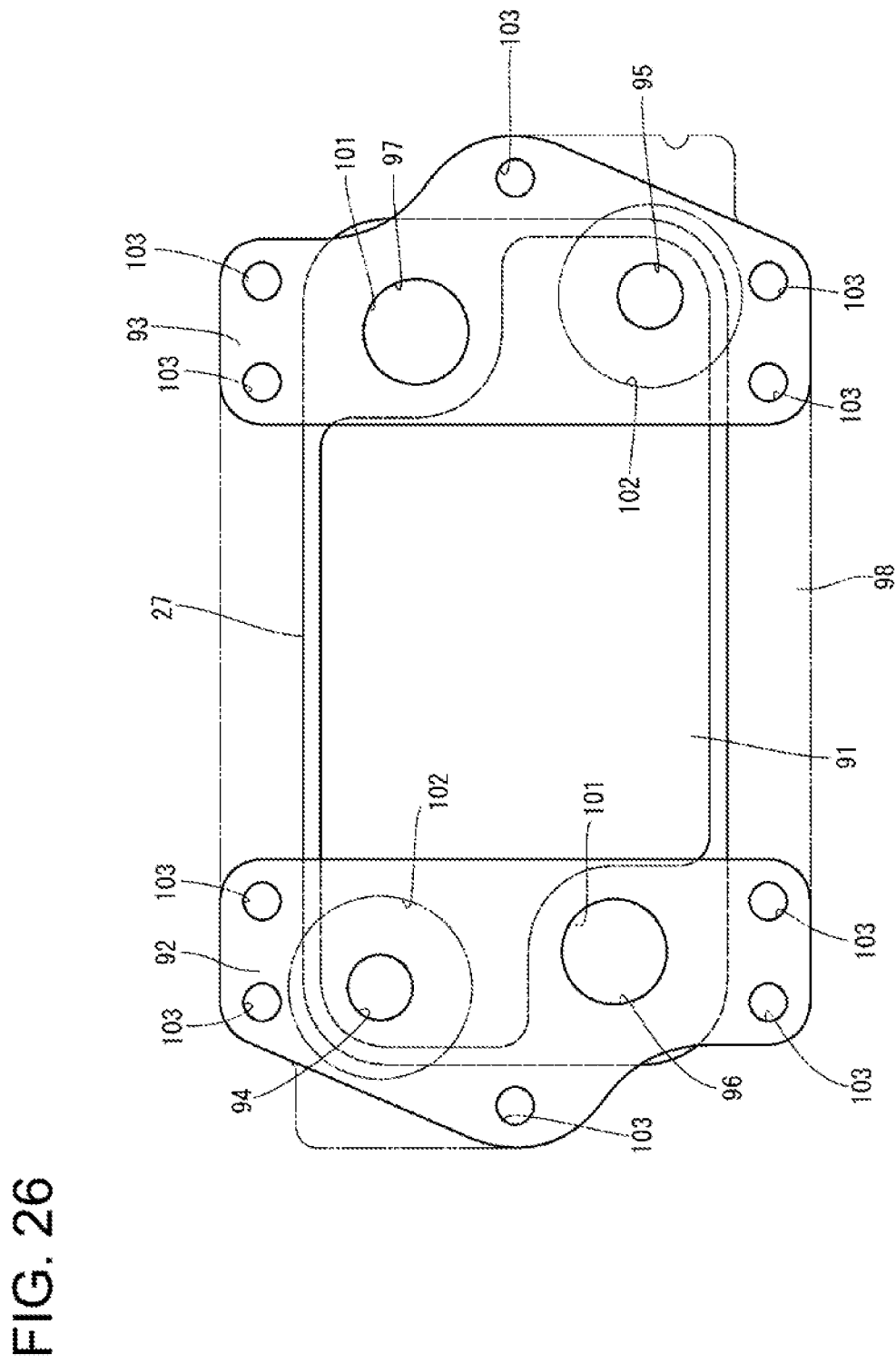
FIG. 26 A rear view of the EGR cooler.
Figure 27:
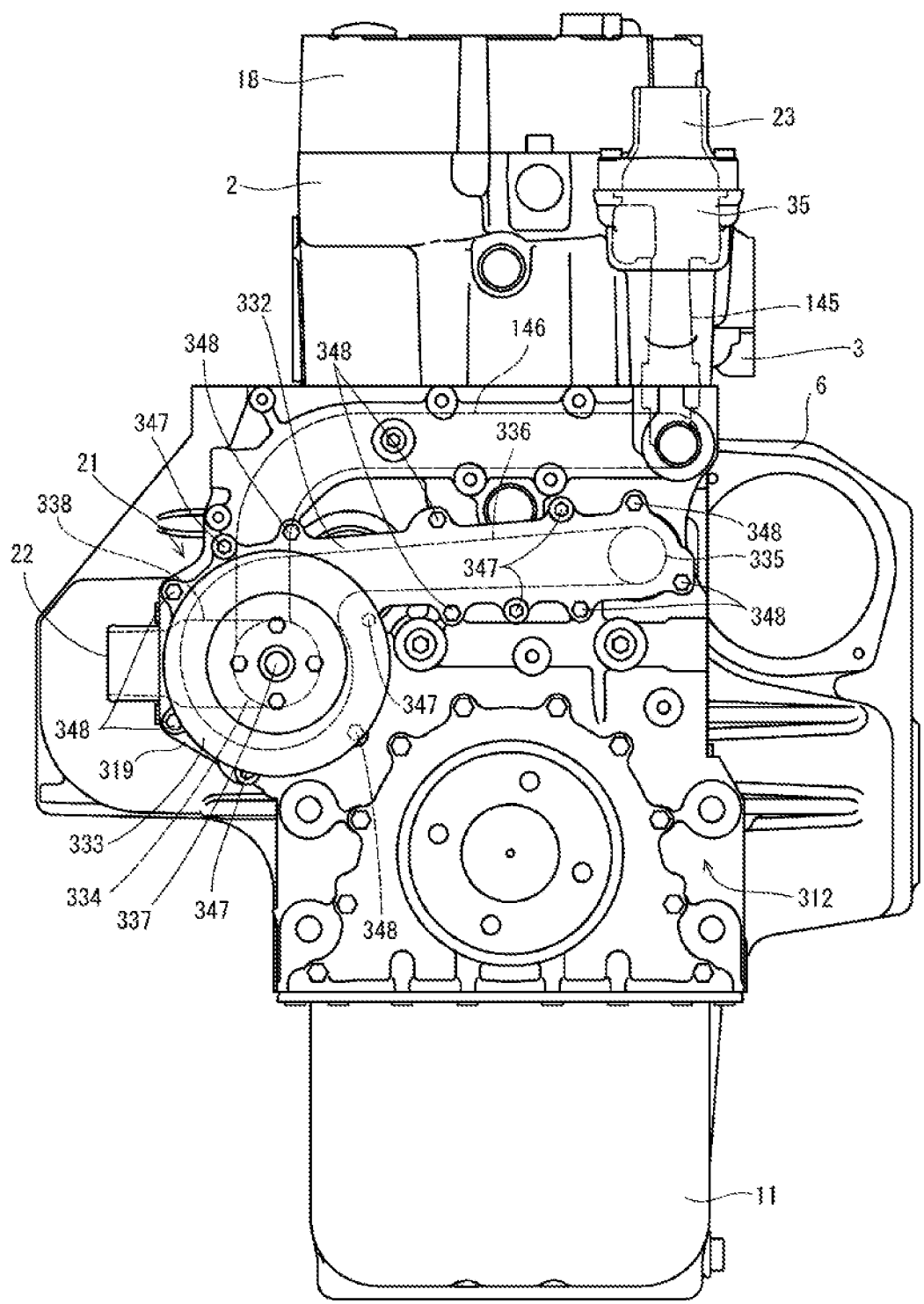
FIG. 27 A rear view showing a structure of a cooling water passage on a cooling water pump side in the engine.
Figure 28:
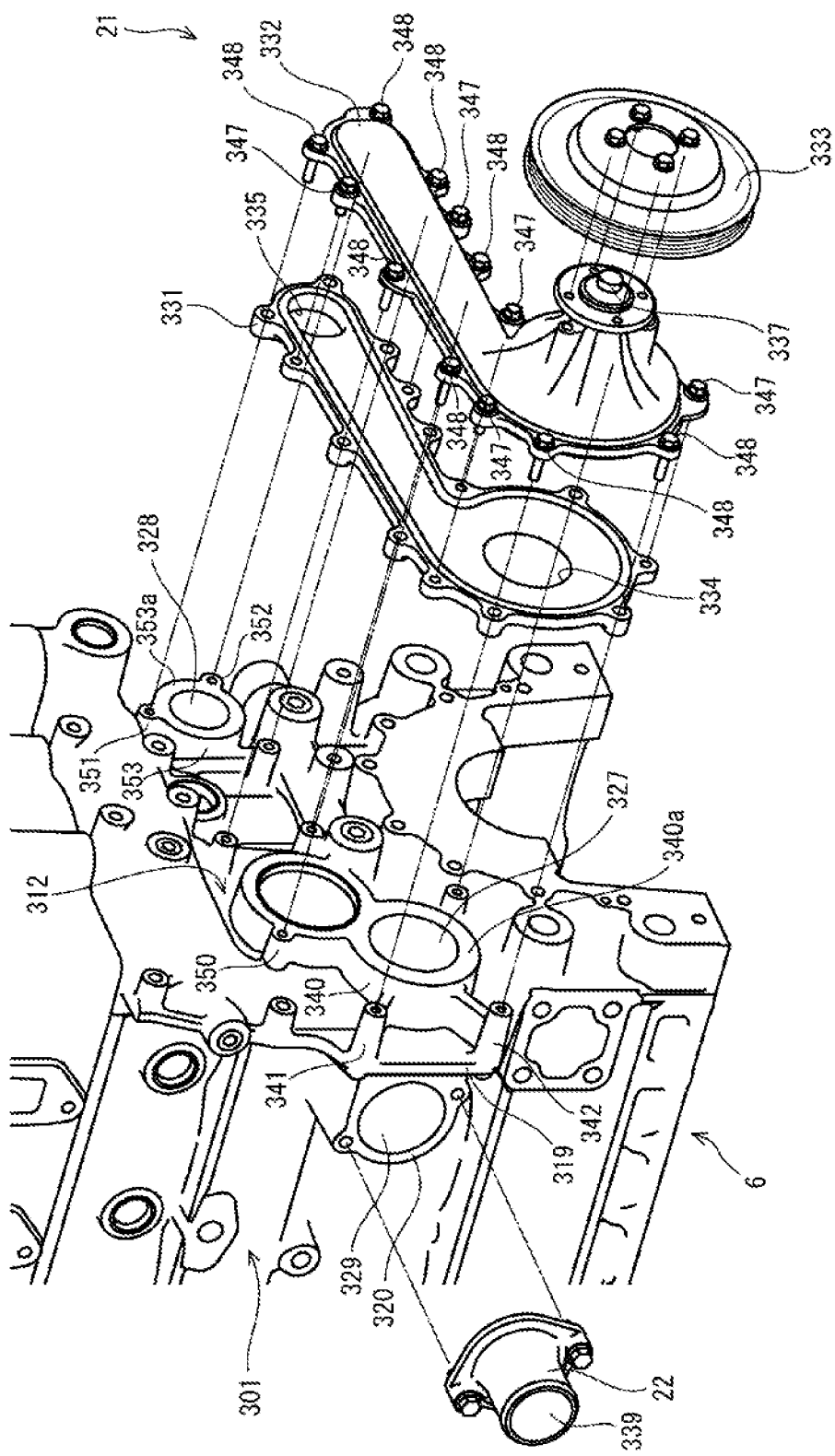
FIG. 28 An exploded perspective view showing a structure of attachment of the cooling water pump and a cooling water inlet pipe.
Figure 29:
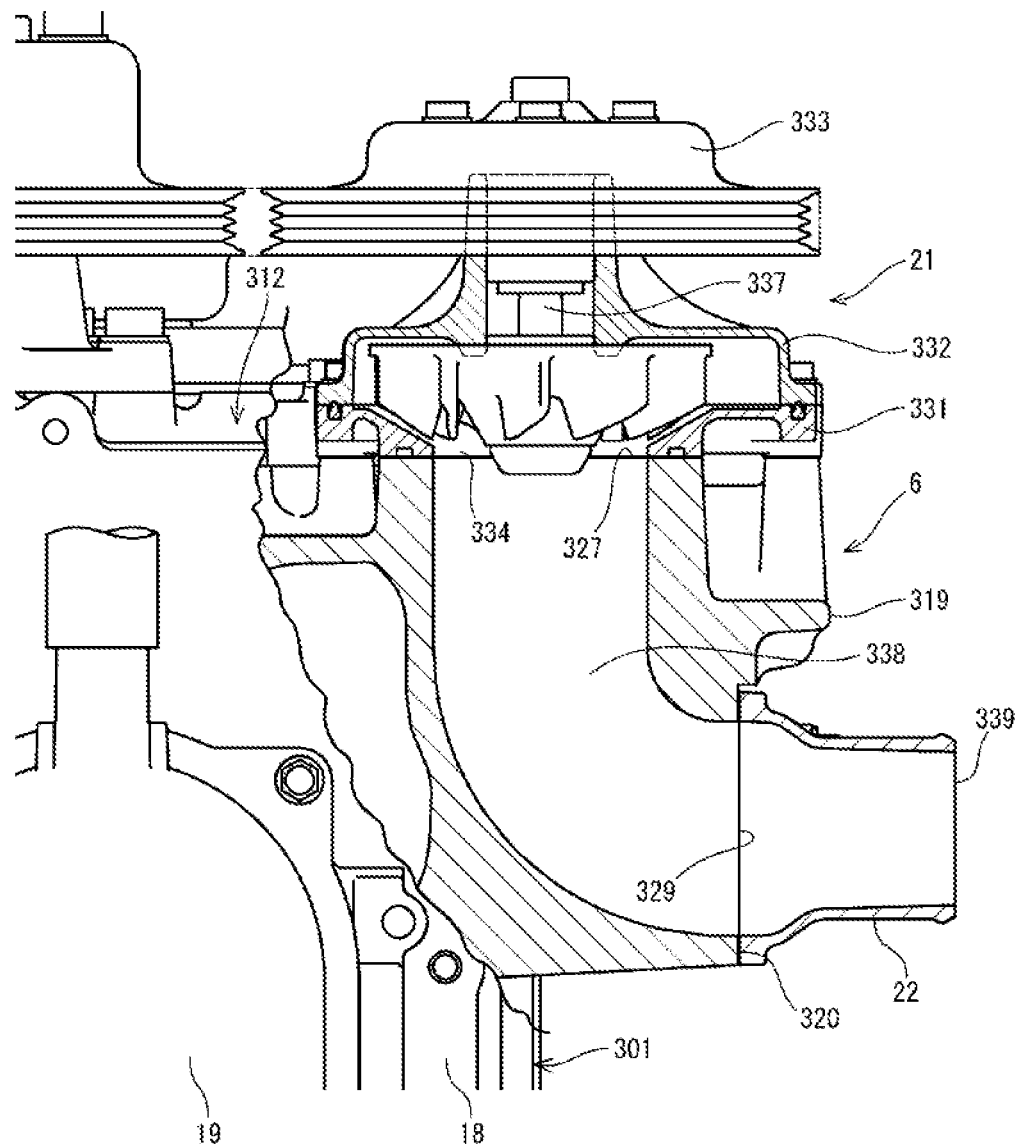
FIG. 29 A plan view showing a partial cross-section of an in-block cooling water passage in the cylinder block.

Next, referring to FIG. 17 to FIG. 19, a structure of the cylinder block 6 and the valve gear structure will be described. The cylinder block 6 has a crank case 171 for accommodating the crankshaft 5 and cylinder bores 173 of four cylinders each of which accommodates a piston 172. Each piston 172 is coupled to the crankshaft 5 via a connecting rod 174, and is arranged in a vertically slidable manner in the cylinder bore 173.

Further, the cylinder block 6 includes: a cam chamber 176 for accommodating a camshaft 175; a block-side push-rod chamber 178 (push-rod chamber) for accommodating the lower end side of a push-rod 177; and a tappet holder 180 for slidably holding a tappet 179. The tappet 179 is arranged between an air-intake cam 175a or an exhaust cam 175b on the camshaft 175 and the push-rod 177, and transmits the drive force of the camshaft 175 to the push-rod 177.

The cam chamber 176 extends in the front-rear direction of the engine 1 on the left side of the cylinder bore 173. The cam chamber 176 is in communication with the crank case 171. The camshaft 175 has a pair of an air-intake cam and an exhaust cam in each cylinder, and has a cam journal which is pivotally supported by a bearing of the cam chamber 176, in a portion between pairs of the intake cam and the exhaust cam. Each of the cam chambers 176 is defined by a plurality of cam chamber segments 181, for each pair of the air-intake cam and the exhaust cam on the camshaft 175 (for each cylinder). In the present embodiment, the cam chamber 176 is partitioned into four cam chamber segments 181.

The block-side push-rod chamber 178 is arranged above the cam chamber 176, and is partitioned for each cylinder. There are four block-side push-rod chambers 178 in the present embodiment, which are aligned in the front-rear direction of the engine 1. Each block-side push-rod chamber 178 has a communication hole 182 in a coupling surface of the cylinder block 6 with the cylinder head 2. In each block-side push-rod chamber 178 and the communication hole 182, the lower end sides of two push-rods 177 are inserted. The tappet holder 180 is formed between the cam chambers 176 and the block-side push-rod chambers 178, and partitions the cam chambers 176 from the push-rod chambers 178. In the cylinder block 6, a bypass passage 183 communicating the cam chamber 176 with the block-side push-rod chamber 178 is formed between the tappet holder 180 and the cylinder bore 173.

Further, the cylinder block 6 has the cooling water jacket 184 arranged around the cylinder bores 173, and the cooling water rail 185 extended in the front-rear direction. The cooling water rail 185 is disposed on the right side of the cylinder bores 173, in a position lower than the cooling water jacket 184. The cooling water rail 185 is meandering in a plan view, substantially along the unevenness in the portion where the cylinder bores 173 for four cylinders are arranged. Further, the cooling water rail 185 is positioned differently from the axes of the head fastening bolts 186 for fixing the cylinder head 2 to the cylinder block 6 in a plan view.

The cylinder head 2 is bolt-fastened to the cylinder block 6 by the head fastening bolts 186. The upper surface of the cylinder head 2 is covered by the head cover 18. A space inside the head cover 18 forms a rocker arm chamber. The valve gear structure 187 associated with the camshaft 175 is arranged in the head cover 18. The cylinder head 2 further has the air-intake valve 136 and the exhaust valve 137 for each cylinder. The present embodiment deals with a case where the engine 1 is a four-valve type having two air-intake valves 136 and two exhaust valves 137 for each cylinder.

The engine 1 is an OHV type, and the valve gear structure 187 includes a rocker arm 189 configured to swing about a front-rear directionally long rocker arm shaft 188 in the head cover 18, along with up and down movement of the tappet 179 and the push-rod 177 caused by the air-intake cam and the exhaust cam on the camshaft 175. The upper end side of the push-rod 177 protrudes inside the head cover 18 through a head-side push-rod chamber 190 provided in the cylinder head 2. The upper end side of the push-rod 177 is coupled with one end side of the rocker arm 189. The other end side of the rocker arm 189 is in contact with the two air-intake valves 136 or the two exhaust valves 137 via a valve bridge 191. The push-rod 177 moves up and down by rotation of the camshaft 175, and the rocker arm 189 rotates about the rocker arm shaft 188, thus opening and closing the pair of air-intake valves 136 and the pair of the exhaust valves 137 of each cylinder.

The crank case 171 is in communication with the head-side push-rod chamber 190 of the cylinder head 2, through the cam chamber 176, the bypass passage 183, and the block-side push-rod chamber 178. The blow-by gas in the crank case 171 moves to the cylinder head 2 side, through the cam chamber 176, the bypass passage 183, and the block-side push-rod chamber 178. It should be noted that the head-side push-rod chamber 190, the block-side push-rod chamber 178, the bypass passage 183, and the cam chamber 176 also serve as an oil-trap path which returns the lubricant in the head cover 18 to the crank case 171 side.

As described above, in the engine 1 of the present embodiment, the tappet holder 180 partitions the cam chambers 176 from the block-side push-rod chambers 178. Further, the bypass passage 183 communicating the cam chamber 176 with the block-side push-rod chamber 178 is formed between the tappet holder 180 and the cylinder bore 173. Thus, the cam chamber 176, the bypass passage 183, and the block-side push-rod chamber 178 structure and form a bent blow-by gas path bypassing the tappet holder 180. Having the blow-by gas hit the wall surface of the bent blow-by gas path induces adhesion of lubricant to the wall surface and bonding of mist-form lubricant. This way, the engine 1 can collect an increased amount of lubricant from the blow-by gas, and reduces the amount of lubricant flowing out from the crank case 171 side to the cylinder head 2 side through the cam chamber 176, the bypass passage 183, and the block-side push-rod chamber 178.

Configurations of the cooling water pump 21 and the cooling water inlet pipe 22 will now be described with reference to FIG. 27 to FIG. 30, and the like. As shown in FIG. 27 to FIG. 30 and the like, a cooling water pump attaching part 319 and an inlet pipe attachment pedestal 320 are provided so as to protrude from a portion of the left surface of the cylinder block 6, the portion being relatively close to the rear surface. To the cooling water pump attaching part 319, the cooling water pump 21 (see FIG. 2, etc.) is attached. To the inlet pipe attachment pedestal 320, the cooling water inlet pipe 22 (see FIG. 3, etc.) is attached. The cooling water pump attaching part 319 and the inlet pipe attachment pedestal 320 are formed integrally with the cylinder block 6. Further, a portion of the inlet pipe attachment pedestal 320 close to the rear side is coupled to the cooling water pump attaching part 319. The cooling water pump attaching part 319 and the inlet pipe attachment pedestal 320 protrude in a direction away from the crankshaft 5, and can improve the rigidity, the strength, and the cooling efficiency of the cylinder block 6.

The cooling water pump 21 for circulating cooling water is fastened to the rear surface 312 of the cylinder block 6 and to the cooling water pump attaching part 319 with bolts. The cooling water pump 21 is roughly divided into a base plate portion 331, a cover plate portion 332, and a pumping pulley 333.

The base plate portion 331 and the cover plate portion 332 have their peripheral edge portions fixed in tight contact with each other by covering bolts 347 that are inserted and fastened, from the cover plate portion 332 side, into five bolting through holes disposed in the peripheral edge portion of the base plate portion 331 and into through holes of the cover plate portion 332 corresponding to the bolting through holes.

The cooling water pump 21 is bolt-fastened to the cylinder block 6 such that the plate portions 331, 332 are clamped together by mounting bolts 348 that are inserted in nine through holes disposed in each of the peripheral edge portions of the base plate portion 331 and the cover plate portion 332. Clamping with the mounting bolts 348 causes the peripheral edge portions of the base plate portion 331 and the cover plate portion 332 to be fixed in tight contact with each other, also causes a portion of the cylinder block 6 surrounding a cooling water outlet port 327 and a portion of the cooling water pump 21 surrounding a pump suction port 334 to be fixed in tight contact with each other, and further causes a portion of the cylinder block 6 surrounding a cooling water inlet port 328 and a portion of the cooling water pump 21 surrounding a pump ejection port 335 to be fixed in tight contact with each other. As for arrangement of the bolts 347, 348 along the peripheral edge portion of the cooling water pump 21, one or two mounting bolts 348 are disposed between adjacent ones of the covering bolts 347, 347.

Since the base plate part 331 and the cover plate part 332 are coupled by the covering bolt 347, the cooling water pump 21 can be distributed as a part, and the attaching work of attaching the cooling water pump 21 to the cylinder block 6 by the attaching bolt 348 can be facilitated.

The base plate portion 331, for example, includes a pump suction port 334 and a pump ejection port 335, the pump suction port 334 being connected to the cooling water outlet port 327 which includes a portion of the cooling water pump attaching part 319 and which is opened in a relatively left portion of the rear surface of the cylinder block 6, the pump ejection port 335 being connected to the cooling water inlet port 328 which is opened in a relatively right portion of the rear surface of the cylinder block 6.

The base plate portion 331 and the cover plate portion 332 have their peripheral edge portions in tight contact with each other, to form an in-pump cooling water passage 336 that connects the pump suction port 334 to the pump ejection port 335. An annular seal member that surrounds the pump suction port 334, the pump ejection port 335, and the in-pump cooling water passage 336 is disposed in a portion where the base plate portion 331 and the cover plate portion 332 are in tight contact with each other. The cover plate portion 332 pivotally supports a pump shaft 337 in a rotatable manner. An impeller is secured to one end portion of the pump shaft 337. The pumping pulley 333 is secured to the other end portion of the pump shaft 337.

A cooling water passage inlet 329 is opened in the left surface of the cylinder block 6. The cooling water passage inlet 329 is opened in the inlet pipe attachment pedestal 320 which protrudes from the left surface. A substantially L-shaped in-block cooling water passage 338 (cooling water passage) connecting the cooling water passage inlet 329 opened on the left surface of the cylinder block 6 to the cooling water outlet port 327 opened on the rear surface of the cylinder block 2 is formed in the cylinder block 6.

The inlet pipe attachment pedestal 320 has a pair of bolt holes on opposite sides of the cooling water passage inlet 329. The cooling water inlet pipe 22 (cooling water inlet member) having a cooling water inlet 339 is detachably fastened to the inlet pipe attachment pedestal 320 with bolts. Piping leading to the cooling water outlet of the radiator is connected to the cooling water inlet pipe 22. A cooling water coming from the radiator is introduced into the engine 1 through the cooling water inlet pipe 22, flows through the in-block cooling water passage 338 and the cooling water pump 21, and then taken into the cylinder block 6 from the cooling water inlet port 328.

In the engine 1 of this embodiment, the cooling water inlet pipe 22 having the cooling water inlet 339 is detachably attached to the cooling water passage inlet 329 which leads to the pump suction port 334 of the cooling water pump 21. Accordingly, the position of the cooling water inlet 339 can be changed just by changing the shape or the like of the cooling water inlet pipe 22. As a result, the position of the cooling water inlet 339 of the cooling water pump 21 can be easily changed without a large design change or an increase in manufacturing costs.

The cooling water outlet port 327 that supplies cooling water from the radiator to the cooling water pump 21 is disposed on one of the left and right sides of the cylinder block 6, while the cooling water inlet port 328 that takes cooling water from the cooling water pump 21 into the cylinder block 6 is disposed on the other of the left and right sides of the cylinder block 6. The in-pump cooling water passage 336 that connects the cooling water outlet port 327 to the cooling water inlet port 328 is disposed across a portion close to the left surface of the cylinder block 6 and a portion close to the right surface of the cylinder block 6. With this configuration, cooling water passing through the in-pump cooling water passage 336 is cooled by cooling air supplied from the cooling fan 9 (see FIG. 2) while the cooling water is moving from the cooling water outlet port 327 to the cooling water inlet port 328. The cooling water can be cooled within the cooling water pump 21 before being taken into the cylinder block 6 from the cooling water inlet port 328. Accordingly, the cooling efficiency of the engine 1 can be enhanced.

The configurations of respective parts of the present invention are not limited to those of the illustrated embodiment, but can be variously changed without departing from the gist of the invention.

REFERENCE SIGNS LIST 1 engine
2 cylinder head
3 air-intake manifold
4 exhaust gas manifold
5 crankshaft
6 cylinder block
7 flywheel housing 8 flywheel
9 cooling fan
24 EGR device
25 collector (EGR main body case)
26 air-intake throttle member
27 EGR cooler
28 recirculation exhaust gas tube
29 EGR valve member
31 upstream EGR gas relay passage
32 downstream EGR gas relay passage
33 EGR cooler coupling base
34 EGR cooler coupling base
35 cooling water drainage
36 air-intake passage
37 exhaust gas passage
38 downstream cooling water relay passage
39 upstream cooling water relay passage
40 intake inlet
41 EGR gas outlet
42 exhaust gas inlet
43 exhaust aggregate part
44 exhaust gas outlet
45 gasket
46 spacer
47 opening
48 fuel tube
91 heat exchanger
92 flange part
93 flange part
94 cooling water outlet
95 cooling water inlet
96 EGR gas inlet
97 EGR gas outlet
98 gasket

The invention claimed is:

1. An engine device comprising:
a cylinder head defining a plurality of air-intake passages configured to receive a fresh air and guide the fresh air into a plurality of air-intake ports and a plurality of exhaust gas passages configured to receive exhaust gas from a plurality of exhaust gas ports;
an exhaust gas manifold in fluid communication with the exhaust gas passages;
an EGR cooler configured to cool EGR gas constituting a part of the exhaust gas from the exhaust gas manifold; and
wherein:
an air-intake manifold configured to aggregate the air-intake passages is formed in one of left and right side portions of the cylinder head;
the EGR cooler is coupled to one of front and rear surfaces of the cylinder head, and an EGR gas passage and a cooling water passage in fluid communication with the EGR cooler are included in a coupling portion of the cylinder head with the EGR cooler;
a first external wall of the cylinder head is interposed between the air-intake manifold and the cooling water passage, the cooling water passage interposed between the first external wall of the cylinder head and at least one cylinder of the cylinder head; and
the cooling water passage is provided along the first external wall and a second external wall of the cylinder head, the first external wall including one of left and right side walls of the cylinder head and the second external wall including one of front and rear side walls of the cylinder head.

2. The engine device according to claim 1, wherein the cylinder head is fastened and fixed above a cylinder block by a plurality of bolts inserted into the first external wall, the second external wall, and a third external wall of the cylinder head, the third external wall including a different one of the front and rear side walls from the second external wall.

3. The engine device according to claim 1, wherein the cylinder head is provided with a cooling water drainage in fluid communication with the cooling water passage at a position adjacent to an end portion of the air-intake manifold on a third external wall of the cylinder head, the third external wall including a different one of the front and rear side walls from the second external wall.

4. The engine device according to claim 1, wherein the first external wall is positioned on the left side wall of the cylinder head.

5. The engine device according to claim 1, wherein the second external wall is positioned on the front side wall of the cylinder head.

6. An engine device comprising:
a cylinder head defining a plurality of air-intake passages configured to receive a fresh air and guide the fresh air into a plurality of air-intake ports and a plurality of exhaust gas passages configured to receive exhaust gas from a plurality of exhaust gas ports;
an exhaust gas manifold in fluid communication with the exhaust gas passages;
an EGR cooler configured to cool EGR gas constituting a part of the exhaust gas from the exhaust gas manifold; and
wherein:
an air-intake manifold is configured to aggregate the air-intake passages is formed in one of left and right side portions of the cylinder head;
the EGR cooler is coupled to an external wall of the cylinder head, the external wall including one of front and rear surfaces of the cylinder head, and an EGR gas passage and a cooling water passage in fluid communication with the EGR cooler are included in a coupling portion of the cylinder head with the EGR cooler;
the coupling portion of the cylinder head includes a pair of left and right coupling bases configured to couple with the EGR cooler, each coupling base of the pair of left and right coupling bases positioned on the external wall of the cylinder head; and
each coupling base of the pair of left and right coupling bases has a structure in which the EGR gas passage and the cooling water passage are bored and arranged one above another.

7. The engine device according to claim 6, wherein:
one of the coupling bases is structured to have the EGR gas passage above the cooling water passage; and
another one of the coupling bases is structured to have the EGR gas passage below the cooling water passage.

8. The engine device according to claim 6, wherein the external wall is positioned on the front surface of the cylinder head.

* * * * *